(12) United States Patent  (10) Patent No.: US 8,539,156 B2
Kamon et al.  (45) Date of Patent: Sep. 17, 2013

(54) STORAGE SUBSYSTEM AND ITS LOGICAL UNIT PROCESSING METHOD

(75) Inventors: Satoshi Kamon, Odawara (JP); Yoshihiro Uchiyama, Odawara (JP)

(73) Assignee: Hitachi, Ltd., Tokyo (JP)

( * ) Notice: Subject to any disclaimer, the term of this patent is extended or adjusted under 35 U.S.C. 154(b) by 335 days.

(21) Appl. No.: 13/002,945

(22) PCT Filed: Dec. 17, 2010

(86) PCT No.: PCT/JP2010/007321
§ 371 (c)(1),
(2), (4) Date: Jan. 6, 2011

(87) PCT Pub. No.: WO2012/081058
PCT Pub. Date: Jun. 21, 2012

(65) Prior Publication Data
US 2012/0159071 A1  Jun. 21, 2012

(51) Int. Cl.
*G06F 12/12* (2006.01)
(52) U.S. Cl.
USPC ..... 711/122; 711/165; 711/118; 711/E12.017
(58) Field of Classification Search
USPC .......................... 711/118, 166, 116
See application file for complete search history.

(56) References Cited

U.S. PATENT DOCUMENTS

| 2007/0112872 A1* | 5/2007 | Saito | 707/200 |
| 2007/0245114 A1* | 10/2007 | Kakui et al. | 711/170 |
| 2010/0042802 A1* | 2/2010 | Helman et al. | 711/173 |

FOREIGN PATENT DOCUMENTS

JP  63-138442  6/1988

OTHER PUBLICATIONS

PCT Invitation to Pay Additional Fees with partial international search report mailed Aug. 2, 2011; 7 pages.

* cited by examiner

*Primary Examiner* — Kenneth Lo
(74) *Attorney, Agent, or Firm* — Foley & Lardner LLP

(57) ABSTRACT

When a command to restore a logical unit is issued after a command to delete the logical unit, the logical unit is restored easily. When a controller receives an LU deletion command from a management terminal and if the relevant LU is a normal LU, it retains information about the deletion target LU, from among information in an LU management table, as reset information; and if the relevant LU is a virtual LU, the controller retains information about the deletion target LU, from among information in a virtual address table, as the reset information. If the controller receives an LU restoration command to restore the deletion target LU as an access target LU, from the management terminal, it restores the retained reset information as setting information corresponding to the access target LU and manages the restored setting information by using the LU management table or the virtual address table, thereby processing an access request from a host computer.

12 Claims, 22 Drawing Sheets

FIG.3

| LU# | LOADING START POSITION | LOADING END POSITION | PHYSICAL START ADDRESS | RG No. | LU NORMAL /VIRTUAL | RESTORATION FLAG ON/OFF | UNREFLECTED DATA EXISTENCE | UNFORMATTED AREA EXISTENCE |
|---|---|---|---|---|---|---|---|---|
| 0000 | 0000 | 0004 | 000000 | 00 | 0 | 0 | 0 | 0 |
| 0001 | 0000 | 0004 | 100000 | 00 | 0 | 1 | 1 | 1 |
| 0002 | 000a 000f | 000e 0013 | – | 01,02 | 1 | 1 | 0 | 0 |
| .. | .. | .. | .. | | .. | .. | .. | .. |
| 4095 | 1510 | 1518 | 000000 | 50 | 0 | 0 | 0 | 0 |

| RG No. | RAID LEVEL | HDD#00 MODEL NAME | HDD#00 PRODUCT NUMBER | HDD#01 MODEL NAME | HDD#01 PRODUCT NUMBER | ... | HDD#27 MODEL NAME | HDD#27 PRODUCT NUMBER |
|---|---|---|---|---|---|---|---|---|
| 00 | 00 | Aa | 00000001 | Aa | 00000010 | | Aa | 0000000f |
| 01 | 02 | Bb | 76543210 | Bb | 76540123 | | | |
| 02 | 05 | Cc | 01237654 | Cc | 02467531 | | Cc | |
| .. | .. | .. | .. | .. | .. | | .. | .. |
| 99 | 05 | Dd | 75310246 | Dd | 05456408 | | | |

| LU# | RG No | VIRTUAL LU ADDRESS (1 ADDRESS: 1BLOCK) | PHYSICAL LU ADDRESS (1 ADDRESS: 32 MB) | RETAINMENT FLAG |
|---|---|---|---|---|
| 0002 | 01 | 00000000~0000F9FF | 00000000 | 1 |
| 0002 | 02 | 0000FA00~0001F3FF | 00000001 | 1 |
| 0002 | FF | 0001F400~0002EDFF | FFFFFFFF | 1 |
| .. | .. | .. | .. | .. |
| 0005 | 02 | 0002EE00~0003E7FF | 0000FFFF | 1 |

STORAGE SUBSYSTEM AND ITS LOGICAL UNIT PROCESSING METHOD

TECHNICAL FIELD

The present invention relates to a storage subsystem having a function restoring a logical unit formed in a physical storage area of a storage unit(s) and also relates to a logical unit processing method for the storage subsystem.

BACKGROUND ART

A storage system in which a storage apparatus (storage subsystem) and a host computer are connected via a network is known. This type of host computer has application programs located therein for performing various business activities and a storage area used in the storage apparatus is allocated to each application program.

Under the above-described circumstance, for example, logical units (LUs) formed in physical storage areas of storage units are provided from the storage apparatus to the host computer. A logical unit number (LUN) as an identifier is assigned to each logical unit and each logical unit is divided into segments, which are minimum I/O access units. A logical block address (LBA) is assigned to each segment.

The host computer can access data stored in an arbitrary storage area in a specific logical unit by sending a logical address composed of the logical unit number and the logical block address to the storage apparatus.

However, a logical unit may sometimes be deleted due to a misoperation by a user. If a logical unit is mistakenly deleted, the user needs to reset the logical unit in order to recover user data.

Meanwhile, a data processing system including a central processing unit and a plurality of external storage devices is suggested, in which a directory for managing restoration information about a deleted file(s) for each external storage device is provided, so that the execution of file deletion processing and restoration processing at a high speed can be ensured by storing restoration information in a device, where a deletion target file exists, in response to a file deletion request (see Patent Literature 1).

CITATION LIST

Patent Literature

PTL 1: Japanese Patent Application Laid-Open (Kokai) Publication No. 63-138442

SUMMARY OF INVENTION

Technical Problem

If the user mistakenly deletes a logical unit and resets it, the format processing will also be executed on a data storage area of the deleted logical unit. In this case, an OS (Operating System) of the storage apparatus executes the format processing on the data storage area corresponding to the deleted logical unit; and after the execution of the format processing, the OS executes backup data restoration processing on the data storage area.

However, if the backup data does not exist, the backup data cannot be restored and user data will be lost. Even if the backup data exists, it takes a long time to execute the format processing on the data storage area corresponding to the deleted logical unit and restore the backup data, so that the user data cannot be recovered in a short period of time.

Furthermore, since the technique disclosed in Patent Literature 1 targets files, the technique disclosed in Patent Literature 1 cannot be directly applied to a system for managing logical units.

The present invention was devised in light of the problems of the above-described conventional art and it is an object of the invention to provide a storage subsystem and its logical unit processing method capable of easily restoring a logical unit when a command to restore the logical unit is issued after a command to delete the logical unit.

Solution to Problem

In order to achieve the above-described object, the present invention is characterized in that when a command to delete a logical unit is issued, setting information about the deletion target logical unit is retained as reset information and format processing on a data storage area for the deletion target logical unit is withheld; and then on the condition that a command to restore the deletion target logical unit is issued, the deletion target logical unit is restored as an access target logical unit in accordance with the retained reset information. Under the above-described circumstance, logical units can be managed by dividing them into normal logical units and virtual logical units and the setting information about the logical units can be managed by using a logical unit management table.

Advantageous Effects of Invention

When a command to restore a logical unit is issued after a command to delete the logical unit, the logical unit can be restored easily according to this invention.

BRIEF DESCRIPTION OF DRAWINGS

FIG. 3 is a configuration diagram of an LU management table.

FIG. 5 is a configuration diagram of an RG management table.

FIG. 6 is a configuration diagram of a virtual address table.

DESCRIPTION OF EMBODIMENTS

An embodiment of the present invention will be explained below with reference to the attached drawings.

First Embodiment

This embodiment is designed so that when an LU deletion command is issued from a management terminal 14 and if the relevant LU is a normal LU, information about the deletion target LU, from among information in an LU management table 90, is retained as reset information; and if the relevant LU is a virtual LU, information about the deletion target LU, from among information in a virtual address table 98, is retained as reset information; and then when an LU restoration command to restore the deletion target LU as an access target LU is issued from the management terminal 14, the retained reset information is restored as setting information corresponding to the access target LU.

(Overall Configuration)

Figure 1:
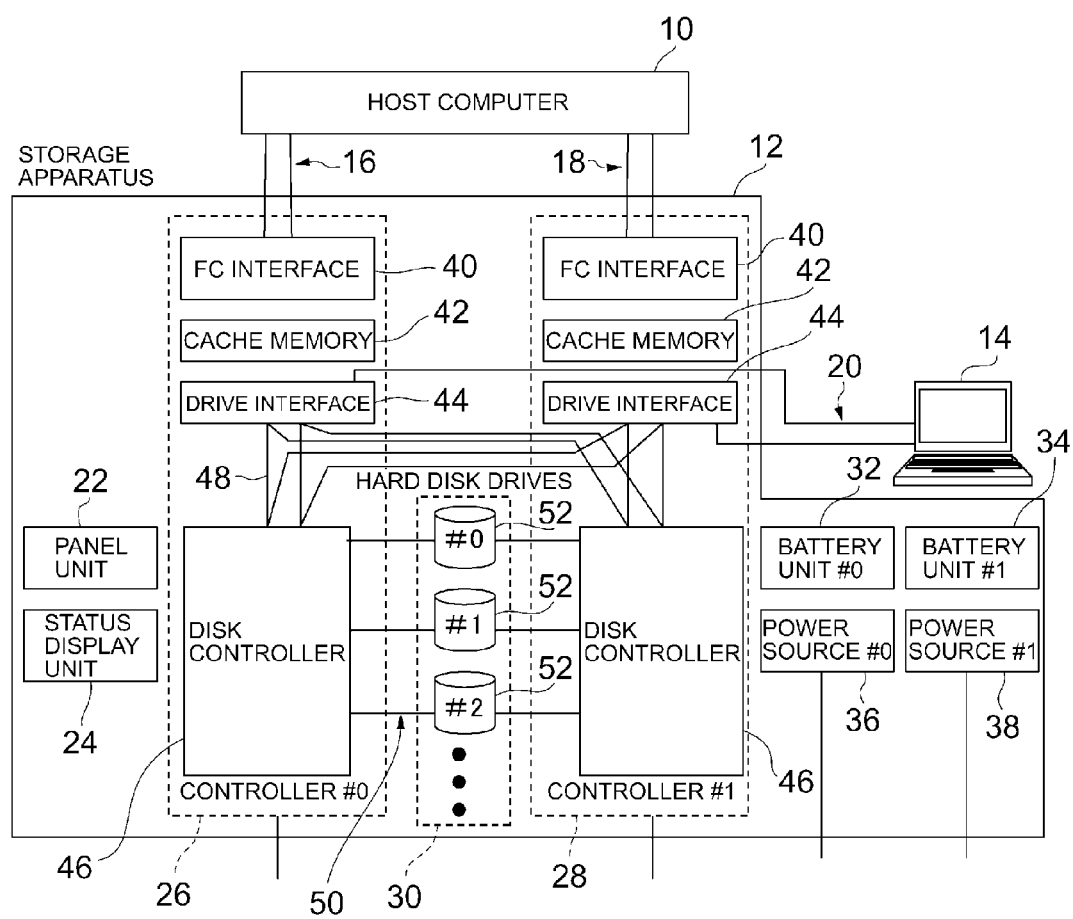
FIG. 1 is a block configuration diagram showing the overall configuration of a computer system to which the present invention is applied.

FIG. 1 is a block diagram of a computer system to which the present invention is applied. Referring to FIG. 1, the computer system includes a host computer 10, a storage apparatus 12, and a management terminal 14; and the host computer 10 and the storage apparatus 12 are connected via networks 16, 18 and the storage apparatus 12 and the management terminal 14 are connected via a network 20.

Incidentally, for example, an FC SAN (Fibre Channel Storage Area Network), an IP SAN (Internet Protocol Storage Area Network), an LAN (Local Area Network), and a WAN (Wide Area Network) can be used as the networks 16, 18, 20.

The host computer 10 is a computer device equipped with information processing resources such as a CPU (Central Processing Unit), a memory, and an input/output interface and is configured as, for example, a personal computer, a workstation, or a main frame. The host computer 10 can access logical units or logical volumes by issuing an access request such as a write request or a read request, including a logical unit or logical volume provided by the storage apparatus 12, to the storage apparatus 12.

The storage apparatus 12 is configured as a storage subsystem including a panel unit 22, a status display unit 24, a controller 26 which is controller #0, a controller 28 which is controller #1, a storage device 30, a battery unit 32 which is battery unit #0, a battery unit 34 which is battery unit #1, a power source 36 which is power source #0, and a power source 38 which is power source #1.

Each controller 26, 28 includes an FC (Fibre Channel) interface 40, a cache memory 42, a drive interface 44, and a disk controller 46; and the drive interface 44 and the disk controller 46 are connected to each other via an internal network 48 and each disk controller 46 is connected via a network 50 to the storage device 30. When receiving an access request from the host computer 10, an access requester, under the above-described circumstance, the controllers 26, 28 control data input/output processing on the storage device 30 based on the access request.

The storage device 30 is composed of a plurality of storage units 52 and each storage unit 52 is composed of hard disk drives (HDDs).

Incidentally, semiconductor memory devices, optical disk devices, magneto-optical disk devices, magnetic tape devices, and flexible disk devices can be used as the storage units 52 instead of the hard disk drives (HDDs).

When the hard disk drives (HDDs) are used as the storage units 52, for example, FC (Fibre Channel) disks, SCSI (Small Computer System Interface) disks, SATA (Serial ATA) disks, ATA (AT Attachment) disks, and SAS (Serial Attached SCSI) disks can be used.

Furthermore, a RAID (Redundant Array of Inexpensive Disks) group such as RAID 4, RAID 5 or RAID 6 can be constituted in each storage unit 52 and each storage unit 52 can be divided into a plurality of RAID groups. Under this circumstance, a plurality of logical units (hereinafter sometimes referred to as LUs (Logical Units)) and a plurality of logical volumes can be formed in a physical storage area of each storage unit 52.

LUs are logical units provided to the host computer 10 as access targets for the host computer 10 and are classified into normal LUs and virtual LUs.

A normal LU is composed of a logical storage area formed in the storage units 52. On the other hand, a virtual LU is provided by means of a thin provisioning function and is composed of a storage are unit called a "page." Before data is written at the beginning of creation of a virtual LU, a page is not associated with a logical storage area formed from a physical storage area. Then, after new data is written to the page, a storage area which is part of the logical storage area formed in the storage units 52 is allocated to the page to which the data has been written, and the data is stored in the allocated storage area.

An LUN (Logical Unit Number) is assigned as an identifier to each normal LU and virtual LU and a logical block address LBA (Logical Block Address) is assigned to each segment. Under this circumstance, the host computer 10 can access data stored in a storage area corresponding to a normal LU or a virtual LU by sending a logical address composed of the identifier LUN and the logical block address LBA to the controller 26 for the storage apparatus 12.

Each power source 36, 38 converts an alternating current from an alternating current system into a direct current and supplies the converted direct current to each battery unit 32, 34. The battery unit 32, 34 has a battery (not shown in the drawing) charged with the direct current supplied from each power source 36, 38 and the direct current is supplied from the battery of each battery unit 32, 34 to the panel unit 22, the status display unit 24, the controllers 26, 28, and the storage device 30.

The management terminal 14 is composed of a personal computer equipped with, for example, a CPU (Central Processing Unit), a memory, an input/output interface, an input device, and an output device. This management terminal 14 issues commands, such as an LU deletion command, a restorable LU reference command, an LU restoration command, and a new LU creation command, to the storage apparatus 12 in accordance with, for example, operation by a user.

Figure 2:
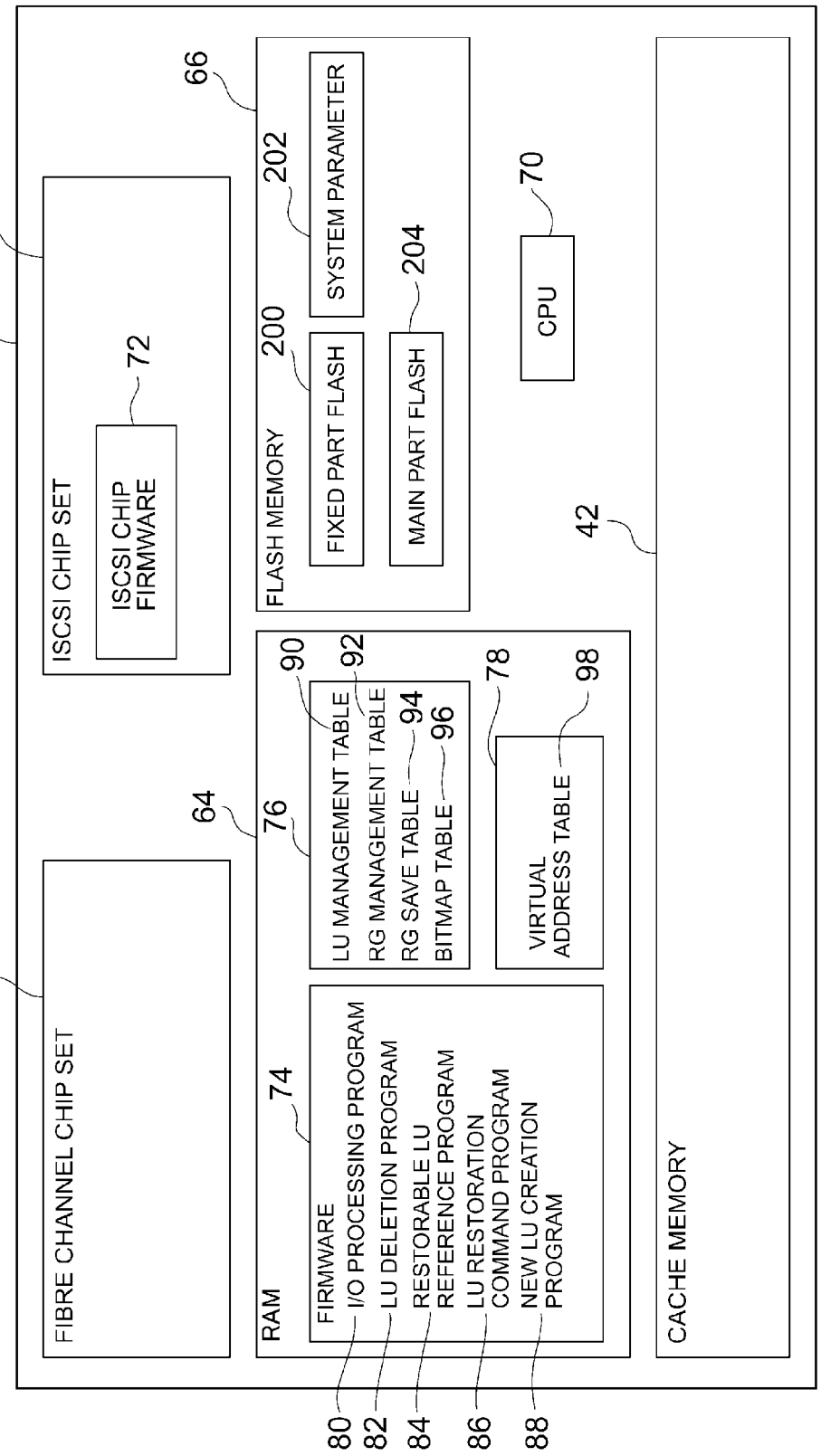
FIG. 2 is a block diagram for explaining a logical configuration of a controller.

Next, FIG. 2 shows a logical configuration diagram of the controller. Incidentally, since the controllers 26, 28 have the same configuration, only the controller 26 will be explained below.

The controller 26 includes a Fibre Channel chip set 60, an iSCSI (internet Small Computer System Interface) chip set 62, a RAM (Random Access Memory) 64, a flash memory 66, a cache memory 42, and a CPU 70. Under this circumstance, the CPU 70, the RAM 64, and the flash memory 66 constitute the disk controller 46 and the Fibre Channel chip set 60 or the iSCSI chip set 62 constitutes the FC interface 40.

The Fibre Channel chip set 60 and the iSCSI chip set 62 are connected to the network 16 or the network 18 and serve as interfaces for sending data to, and receiving data from, the host computer 10. Under this circumstance, the Fibre Channel chip set 60 is selected when the FC protocol is used as the protocol for the networks 16, 18; and the iSCSI chip set 62 is selected when iSCSI is used as the protocol for the networks 16, 18. Incidentally, iSCSI programs are stored in iSCSI chip firmware 72 for the iSCSI chip set 62.

The RAM 64 includes a firmware storage area 74, a configuration information storage area 76, and a virtual information storage area 78; and the firmware storage area 74 stores an I/O processing program 80, an LU deletion program 82, a restorable LU reference program 84, an LU restoration command program 86, and a new LU creation program 88.

On the other hand, the configuration information storage area 76 stores an LU management table 90, an RG (RAID Group) management table 92, an RG (RAID Group) save table 94, and a bitmap table 96.

The virtual information storage area 78 stores a virtual address table 98. The configuration of these programs and tables will be described later.

The flash memory 66 stores a fixed part flash 200, a system parameter 202, and a main part flash 204 as device start-up programs. The programs stored in the flash memory 66 are used to load information about various programs and various tables, which are stored in the storage units 52, to the RAM 64 when starting the storage apparatus 12.

The CPU 70 serves as a control unit for supervising and controlling the entire controller 26. Under this circumstance, the CPU 70 activates various programs stored in the RAM 64 and temporarily stores data associated with the activation of the various programs in the cache memory 42.

Specifically speaking, the CPU 70 performs protocol conversion of data packets sent and received between the FC interface 40 and the host computer 10, deletes headers and so on, fetches I/O commands and data from the data packets, and writes them to the cache memory 42.

The CPU 70 refers to the cache memory 42 periodically or at specified timing, fetches I/O data, which it should process, from the cache memory 42, and sends the I/O data to the storage units 52.

For example, if the I/O data is I/O data upon a write request, the CPU 70 converts the logical address into the physical address and writes a data entity to a storage area indicated by the converted physical address. On the other hand, if the I/O data is I/O data upon a read request, the CPU 70 converts the logical address into the physical address, reads a data entity from a storage area indicated by the converted physical address, writes it to the cache memory 42, and sends the data written to the cache memory 42 from the FC interface 40 to the host computer 10.

Next, FIG. 3 shows a configuration diagram of the LU management table.

Referring to FIG. 3, the LU management table 90 is a table used by the CPU 70 to manage LUs by dividing them into normal LUs and virtual LUs; and includes an LU number field 300, a loading start position field 302, a loading end position field 304, a physical start address field 306, an RG (RAID Group) number field 308, a normal/virtual LU field 310, a restoration flag on/off field 312, an unreflected data existence field 314, and an unformatted area existence field 316.

The LU number is a number for uniquely identifying an LU in the storage apparatus 12. If there are, for example, 4096 LUs, each entry in the LU number field 300 stores information 0000 to 4095 as the LU number of LU #0 to LU #4095.

The loading start position is information indicating a loading start position of a storage unit 52 corresponding to each LU. For example, if the loading start position of LU #0 is the storage unit 52 which is #0, entry 320 stores 0000.

The loading end position is information indicating a loading end position of a storage unit 52 corresponding to each LU. For example, if the loading end position of LU #0 is the storage unit 52 which is #4, the entry 320 stores information 0004.

The physical start address is a start address (physical address) of a data storage location corresponding to each LU. For example, if data corresponding to LU #0 is stored at a position starting from #0 in the data storage area of the storage unit 52, the entry 320 stores information 0000 as a physical address indicating the data storage location of the data corresponding to LU #0.

The RG number is a group number given when dividing each storage unit 52 into a plurality of RAID groups. For example, if each storage unit 52 is divided into 50 RAID groups and LU #0 belongs to RAID group #0, the entry 320 stores information 00. When LU #1 belongs to the same RAID group as LU #0, the entry 322 stores information 00. If the loading start position of LU #1 is the storage unit 52 which is #0 under the above-described circumstance, the entry 322 stores 0000; and if the loading end position of LU #1 is the storage unit 52 which is #4, the entry 322 stores information 0004. Furthermore, if data corresponding to LU #1 is stored at a position from #100000 in the data storage area of the storage unit 52, the entry 322 stores information 100000 as a physical address indicating the data storage location of the data corresponding to LU #1.

The normal/virtual LU is information for judging whether the relevant LU is a normal LU or a virtual LU. If the LU is a normal LU, information 0 is store; and if the LU is a virtual LU, information 1 is stored. For example, if LU #0 and LU #1 are composed of normal LUs, the entries 320, 322 store the information 0; and if LU #2 is composed of a virtual LU, entry 324 stores the information 1. If virtual LU #2 belongs to a plurality of RAID groups under the above-described circumstance, the entry 324 in the RG number field 308 stores, for example, 01, 02. Since the physical address of the virtual LU #2 cannot be specified, the entry 324 in the physical start address field 306 stores information. Incidentally, the entry 324 in the loading start position field 302 and the loading end position field 304 stores information 000a000f and 000e0013, respectively.

The restoration flag on/off is information indicating whether the relevant LU is designated as a deletion target LU at the time of LU deletion. If the relevant LU is not designated as the deletion target LU at the time of LU deletion, the relevant entry in the restoration flag on/off field 312 stores information 0; and if the relevant LU is designated as the deletion target LU, the relevant entry stores information 1. For example, if LU #1 and LU #2 are designated as deletion target LUs at the time of LU deletion, the entries 322, 324 for the restoration flag on/off field 312 store the information 1. The deletion target LU whose restoration flag on/off field 312 stores 1 may be treated in the same manner as an LU deleted from the LU management table in processing, on the LU other than restorable LU reference processing, LU restoration processing and new LU creation processing described later, and may be designed so that such LU will not be recognized by the host computer 10.

Incidentally, when creating a new LU or restoring an LU, 0 is set, as information indicating that the restoration flag is off, to each entry in the restoration flag on/off field 312.

The unreflected data existence is set as information indicating whether or not data which corresponds to the deletion target LU at the time of LU deletion and exists in the cache memory 42 is unreflected data which is not reflected in the storage units 52 (data not stored in the storage units 52). If the unreflected data exists in the cache memory 42, the relevant entry in the unreflected data existence field 314 stores information 1; and if the unreflected data does not exist in the cache memory 42, the relevant entry in the unreflected data existence field 314 stores information 0. For example, if the unreflected data exists as data relating to LU #1 in the cache memory 42, the entry 322 stores the information 1.

The unformatted area existence is set as information indicating whether or not an unformatted area exists in the data storage area of the deletion target LU at the time of LU deletion. If an unformatted area exists at the time of LU deletion during formatting of the data storage area of the deletion target LU, the relevant entry in the unformatted area existence field 316 stores information 1; and if the unformatted area does not exist, the relevant entry in the unformatted area existence field 316 stores information 0. For example, if an unformatted area exists at the time of deletion of LU #1 during formatting of a data storage area (for example, a storage area composed of a segment of the storage units 52) of LU #1, the entry 322 stores the information 1.

Under the above-described circumstance, the controller 26 manages whether the data storage area of the relevant LU is formatted or unformatted, by using the bitmap table 96 during the course of execution of the format processing on the LU.

Figure 4:
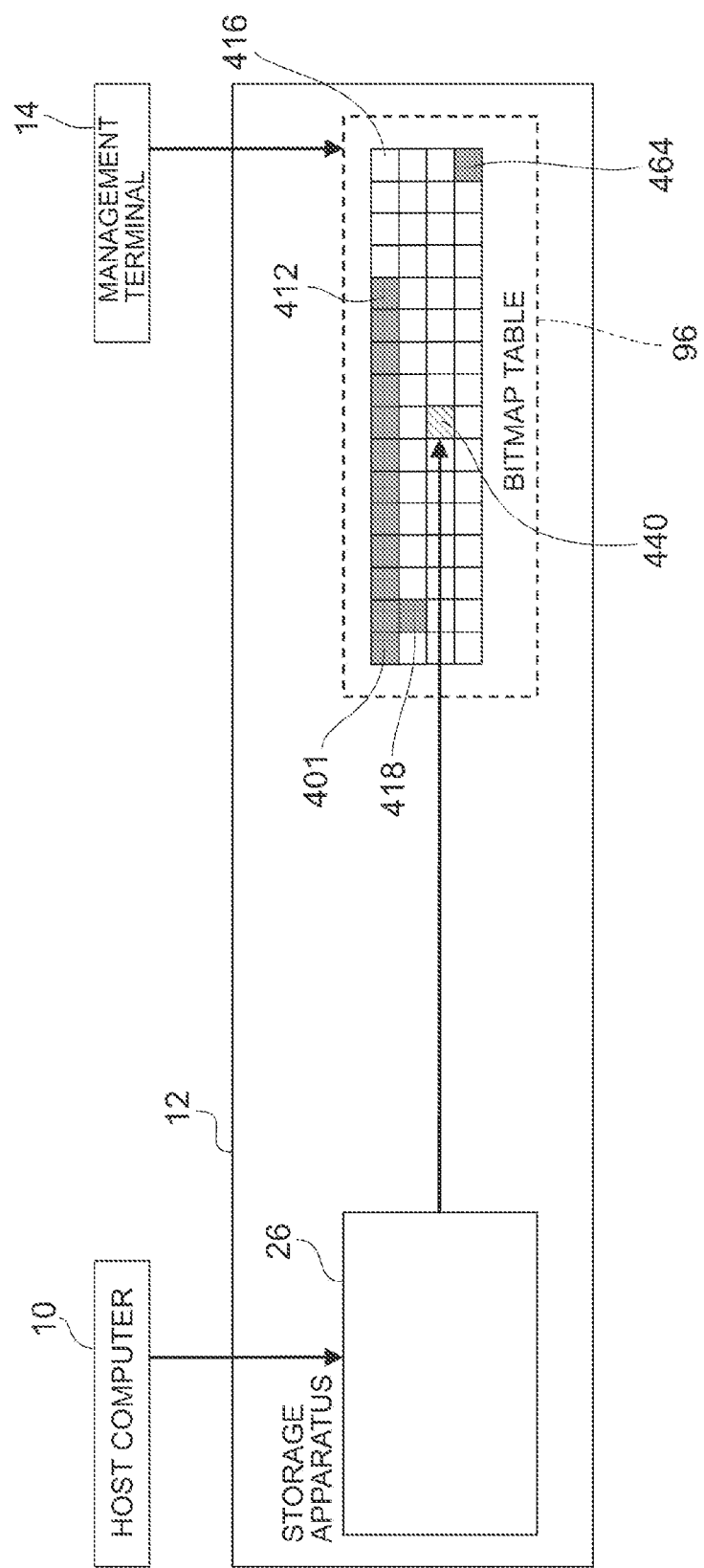
FIG. 4 is a schematic diagram explaining quick format processing.

Next, FIG. 4 shows a functional block diagram for managing the bitmap table.

When a command to execute the format processing on an LU is issued from the management terminal 14 to the storage apparatus 12, the CPU 70 executes quick format processing, divides an area of the bitmap table 96 into a plurality of areas 401 to 464 in association with the data storage areas of the processing target LU, sequentially execute the format processing (for example, processing for setting a value of each data storage area to 0) on the data storage areas, and records the execution result in each area 401 to 464.

When the above-described processing is executed, the CPU 70 stores the information 0 in an unformatted area of the data storage areas, on which the format processing has not been executed, from among the plurality of areas 401 to 464, and stores the information 1 in a formatted area, for which the format processing has been completed. For example, the information 1 is stored in the areas 401 to 412, 418, 464 because the format processing on the data storage areas is completed; and the information 0 is stored in other areas which are recognized as unformatted areas for which the format processing is not executed on the data storage areas.

If an access request is issued from the host computer 10 to the storage apparatus 12 in the process of executing the format processing on an LU, the CPU 70 refers to the bitmap table 96 when storing data in the cache memory 42; and if the access target area is an unformatted area, the CPU 70 executes the format processing and then access processing on the unformatted area.

For example, if the area 440 is an access target area, since this area is an unformatted area, the CPU 70 executes the format processing and then the access processing on the data storage area corresponding to the area 440.

On the other hand, if the access target area is a formatted area, for example, if the area 401 is an access target area, the CPU 70 immediately executes the access processing on the area 401 because the area 401 is the formatted area. In other words, the CPU 70 executes the access processing for writing write data from the host computer 10 to the area 401.

Next, FIG. 5 shows the configuration of the RG management table.

Referring to FIG. 5, the RG management table 92 includes an RG number field 500, a RAID level field 502, an HDD (Hard Disk Drive) number model name field 504, an HDD number product number field 506, an HDD number model name field 508, an HDD number product number field 510, an HDD number model name field 512, and an HDD number product number field 514.

This RG management table 92 is a storage unit management table used by the CPU 70 to manage the plurality of storage units 52 by dividing them into RAID groups; and this RG management table 92 records the product number of the storage units 52 as specific storage unit information for specifying each storage unit 52.

The RG number is a group number that is assigned to each group when each storage unit 52 is divided into a plurality of RAID groups, and is a unique identification number in the storage apparatus 12. Each entry in the RG number field 500 stores the number of each RAID group. For example, if RAID groups 0 to 99 are constituted from each storage unit 52, entries 520 to 526 store the numbers 00 to 99 as the numbers corresponding to the RAID groups 0 to 99, respectively.

The RAID level is information about the RAID group level. Each entry in the RAID level field 502 stores information indicating the number corresponding to the RAID level. For example, if the RAID group level of RAID group 0 is 0, entry 520 stores 0 as the identifier indicating the RAID level; if the RAID group level of RAID group 1 is 2, entry 522 stores 02 as the identifier indicating the RAID level; and if the RAID group level of RAID group 99 is 5, entry 524 stores 05 as the identifier indicating the RAID level.

The HDD number model name is information for specifying the model name corresponding to the number of the storage unit 52. The HDD number model name fields 504, 508, 512 store information about the model name of the relevant storage unit 52 belonging to each RAID group. For example, the entry 520 stores Aa as the model name of the storage unit 52 and the entry 522 stores Bb as the model name of the storage unit 52. Furthermore, the RG save table 94 has the same configuration as that of the RG management table 92. If any LU is not deleted as described later, information about any RG is not stored; however, after deletion of an LU, information about the deletion target LU is stored in the RG save table 94.

The HDD number product number is information about the product number of the storage units 52 belonging to each RAID group. Each entry in the HDD number product number fields 506, 510, 514 stores information about the product number of the storage units 52 belonging to each RAID group. For example, if the storage units 52 constituting RAID group 0 are composed of product numbers 1 to 10, the entry 520 stores information 00000001 to 00000010. If the storage units 52 constituting RAID group 1 are composed of product numbers 76543210 to 76540123, the entry 522 store information 76543210 to 76540123.

Next, FIG. 6 shows the configuration of the virtual address table.

Referring to FIG. 6, the virtual address table 98 is a table used by the CPU 70 to manage a relationship between the virtual address of virtual LUs and the physical address; and includes an LU number field 600, an RG number field 602, a virtual LU address field 604, a physical LU address field 606, and a retainment flag field 608.

The LU number is a number for uniquely identifying a virtual LU in the storage apparatus 12. Each entry in the LU number field 600 stores the virtual LU number. For example, if LU #2 is a virtual LU which is composed by allocating part of logical storage areas from two logical storage areas to each page, entries 620, 622 store the virtual LU number 0002.

The RG number is the number of a RAID group to which the logical storage areas with its part of storage areas provided to the relevant virtual LU belongs. Each entry in the RG number field 602 stores the number of the RAID group to which the logical storage areas with its part of storage areas provided to the relevant virtual LU belongs. For example, if LU #2 is a virtual LU and storage areas are provided from logical storage areas belonging to RAID groups #1, #2, entry 620 stores information 01 and entry 622 stores information 02.

The virtual LU address is information about virtual LU addresses and one address corresponds to one block. Each entry in the virtual LU address field 604 stores information about the address of the relevant virtual LU. For example, if LU #2 is a virtual LU and storage areas are allocated from the logical storage areas to two storage areas in the relevant virtual LU, the entry 620 stores 00000000 to 0000F9FF and the entry 622 stores 0000FA00 to 0001F3FF as the addresses indicating each storage area allocated in the virtual LU.

The physical LU address is a physical address corresponding to the virtual LU address and an address indicating the storage location of actual data. One address corresponds to 32 MB. Each entry in the physical LU address field 606 stores the physical address corresponding to the virtual LU address. For example, the entry 620 stores 00000000 as the physical address of one of the two storage areas allocated to the virtual LU #2 and the entry 622 stores information 00000001 as the physical address of the other storage area of the two storage areas allocated to the virtual LU #2.

The retainment flag is set as information indicating whether or not it is necessary to retain the virtual address table 98 at the time of LU deletion. Each entry in the retainment flag field 608 stores: information 1 when it is necessary to retain the information in the virtual address table 98 at the time of LU deletion; and information 0 indicating that it is unnecessary to retain the information in the virtual address table 98 when creating a new LU or restoring an LU.

Incidentally, when part of the logical storage areas from among the storage areas constituting the relevant virtual LU is not allocated, the RG number field 602 and the physical LU address field 606 corresponding to the LU number field 600 and the virtual LU address field 604 store values indicating Not Allocated. The RG number field 602 and the physical LU address field 606 store values FF and FFFFFFFF, respectively, indicating Not Allocated. For example, if the logical storage area is not allocated to the storage areas indicated with the virtual LU addresses 0001F400~0002EDFF of the virtual LU #2 as shown in the entry 624, the RG number field 602 and the physical LU address field 606 store the values FF and FFFFFFFF, respectively, indicating Not Allocated.

Figure 7:
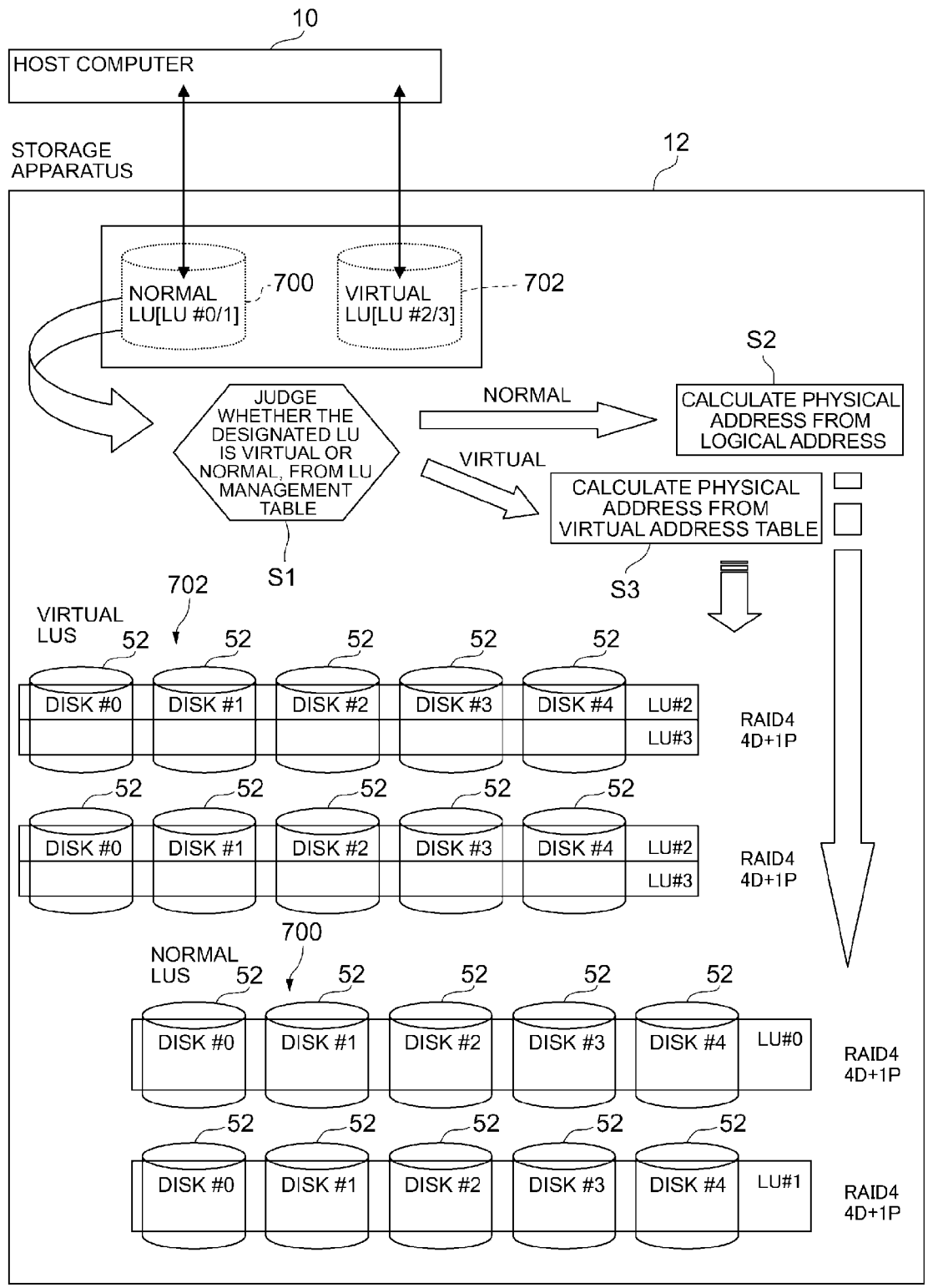
FIG. 7 is a conceptual diagram explaining a logical configuration of normal LUs and virtual LUs.

Next, FIG. 7 shows a logical configuration diagram of normal LUs and virtual LUs.

When constituting a RAID by using the storage units 52, for example, it is possible to constitute RAID 4. In this case, the storage units 52 from #0 to #3 are configured as storage units for data storage and the storage unit 52 which is #4 is configured as a storage unit for parity storage.

Logical storage areas are formed in the physical storage areas of the storage units 52 of RAID 4. When forming LUs from part or whole of one logical storage area or from a plurality of logical storage areas and providing them to the host computer 10, it is possible to configure LU #0 and LU #1 as normal LUs 700. Under this circumstance, LU #0 and LU #1 can be formed into different RAID groups. Furthermore, it is possible to configure LU #2 and LU #3 as virtual LUs 702 and provide them to the host computer 10. Regarding LU #2 and LU #3 under this circumstance, part of the storage areas in the logical storage areas is allocated to each storage area unit constituting each LU. For example, with regard to a plurality of storage areas constituting LU #2, a storage area can be also allocated from the logical storage areas formed in different RAID groups to each of the plurality of storage areas.

When managing the LUs in the storage apparatus 12 by dividing them into the normal LUs 700 and the virtual LUs 702, the normal LUs 700 and the virtual LU 702 are provided as access targets from the storage apparatus 12 to the host computer 10.

After the host computer 10 attaches the logical address including the LU number and the LBA to an access request and sending it to the storage apparatus 12, the CPU 70 for the storage apparatus 12 refers to the LU management table 90 based on the logical address and judges whether the LU (access target LU) designated by the access request is a normal LU 700 or a virtual LU 702 (S1).

If it is determined that the access target LU is a normal LU 700, the CPU 70 calculates the physical address from the logical address (S2), and then accesses the storage unit 52 of the normal LU 700 in accordance with the calculated physical address. For example, the CPU 70 accesses the physical storage area of the storage unit 52 corresponding to LU #0.

On the other hand, if it is determined that the access target LU is a virtual LU 702, the CPU 70 refers to the virtual address table 98 based on the LU number and the logical address, calculates the physical LU address from the virtual LU address corresponding to the logical address for which the access request is made (S3), and accesses the physical storage area of the storage unit 52 belonging to the virtual LU 702 in accordance with the calculated physical LU address. For example, if the virtual LU 702 is LU #2, the CPU 70 accesses the physical storage area of the storage units 52 constituting LU #2. If the physical address corresponding to the logical address for which the access request is made does not exist and the access request is a write request, the CPU 70 allocates the physical LU address to the virtual LU address corresponding to the logical address, for which the access request is made, and writes data to the storage unit 72 indicated by the physical LU address. If the access request is a read request, the CPU 70 notifies the host computer 10 of an error.

Figure 8:
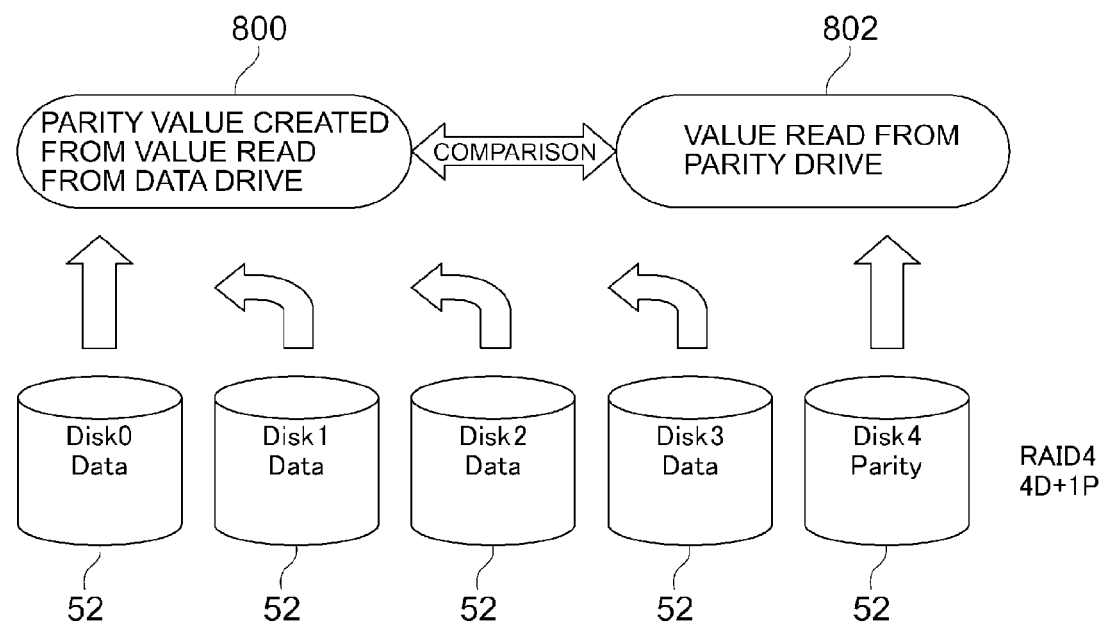
FIG. 8 is a schematic diagram explaining parity recovery processing.

Next, FIG. 8 shows a schematic diagram explaining a parity recovery function. Referring to FIG. 8, the parity recovery function is processing for recovering parity without interrupting access from the host computer 10 to an arbitrary LU. The CPU 70 might lose data in the cache memory 42, which is being written from the cache memory 42 to the storage units 52, due to, for example, volatilization of the cache memory 42 caused by power shutdown or similar. In such a case, a mismatch may occur between a parity value 800 created by reading a data value stored in the storage units 52 for data storage from among the storage units 52 and a parity value 802 read from the storage unit 52 for parity storage. In order to solve this parity mismatch, parity recovery processing is executed on the LU, whose data is lost, on the background without interrupting access from the host computer 10. Under this circumstance, the CPU 70 executes processing including the parity mismatch check and the recovery processing (drive reading/writing and verification) on a stripe string basis.

The parity mismatch check is processing executed by the CPU 70 for comparing the parity value 800 created by reading a data value stored in the storage units 52 for data storage from among the storage units 52 with the parity value 802 read from the storage unit 52 for parity storage and checking whether these two values are equal to each other or not. If it is determined as a result of this parity mismatch check that these two parity values are different, the CPU 70 writes the parity value, which is created based on the data value read from the storage units 52 #0 to #3 for data storage, as a new parity value to the storage unit 52 for parity storage and makes the two parity values identical to each other, thereby making it possible to recover the parity value mismatch.

Figure 9:
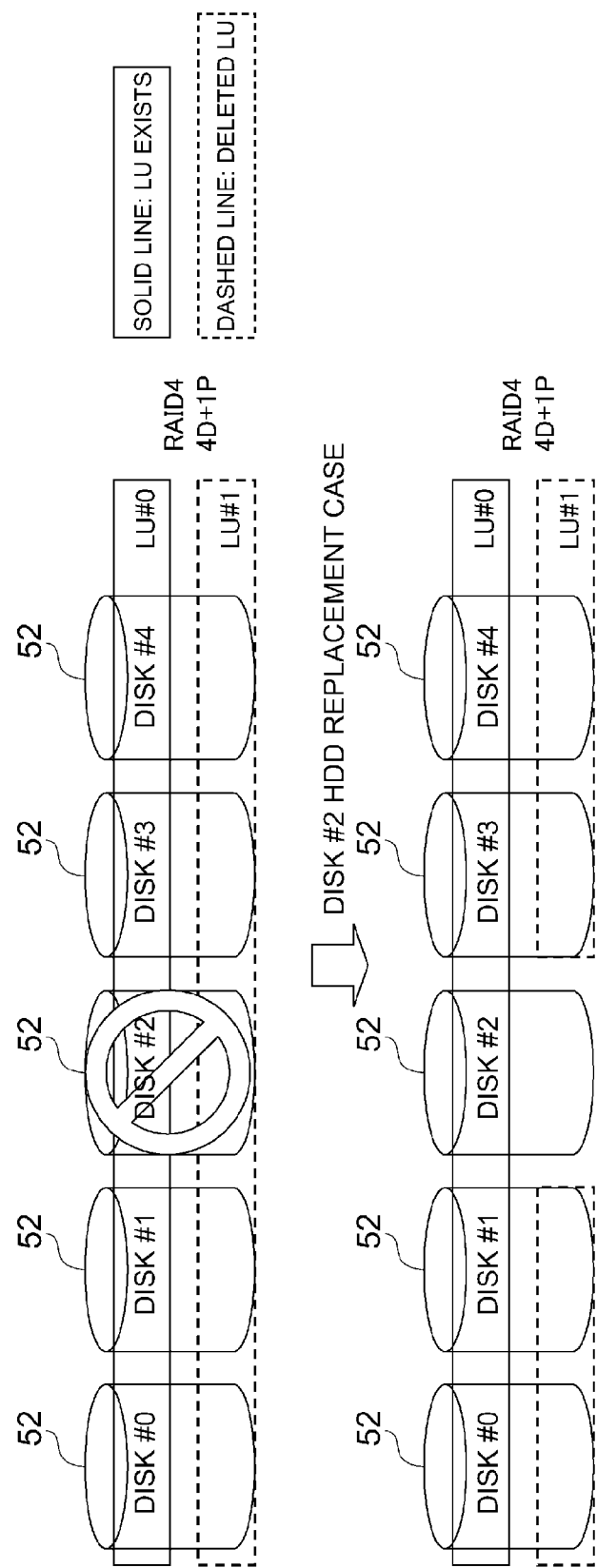
FIG. 9 is a schematic diagram explaining processing associated with replacement of a storage unit.

Next, FIG. 9 shows a schematic diagram explaining processing for judging whether a storage unit is replaced or not.

The storage unit(s) 52 constituting the RAID is sometimes replaced with a new storage unit because of, for example, a failure. Under this circumstance, the storage unit 52 may be sometimes replaced after an LU is deleted and before the LU is restored. For example, if the storage unit 52 #2 for data storage which constitutes LU #0, from among the storage units 52 constituting RAID 4, is replaced, data which should be stored in the new storage unit 52 can be created based on data stored in the storage units 52 #0, #1, #3 for data storage and the parity value stored in the storage unit 52 #4 for parity storage, on the condition that the setting information about LU #0, for example, information in the LU management table 90, exists.

On the other hand, if the storage unit 52 #2 for data storage constituting LU #1 is replaced and the setting information about LU #1, for example, the information in the LU management table 90, is deleted after LU #1 is deleted and before LU #1 is restored, even if data remains in the storage units 52 #0, #1, #3 for data storage constituting LU #1 and the storage unit 52 #4 for parity storage, LU #1 is deleted and, therefore, LU #1 cannot be accessed. Therefore, the data which should be stored in the new storage unit 52 cannot be recovered.

Figure 10:
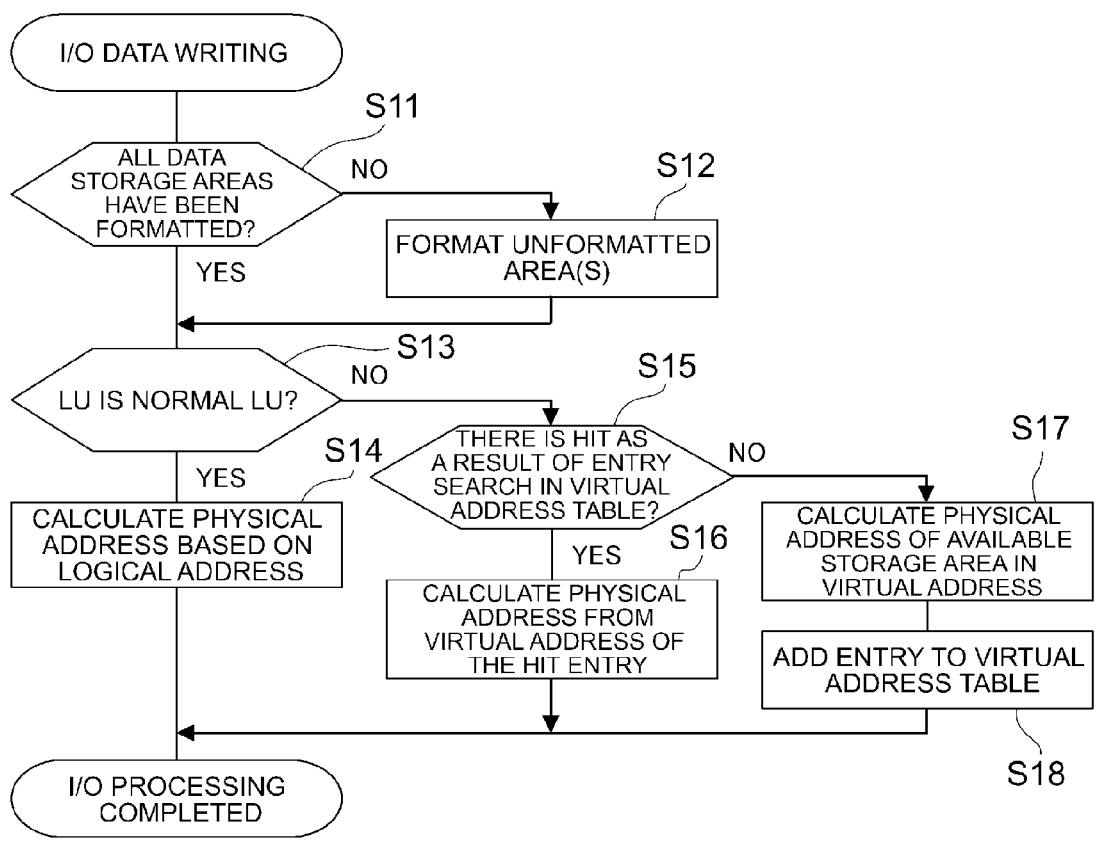
FIG. 10 is a flowchart explaining processing for writing I/O data.

Next, I/O data write processing will be explained with reference to a flowchart in FIG. 10. This processing is executed by the CPU 70 for the controller 26.

The CPU 70 receives write access as an access request from the host computer 10 and judges whether all access areas designated by a logical address attached to the write access have been formatted or not (S11). If it is determined that all the access areas have not been formatted (S11: No), the CPU 70 executes the format processing, for example, quick format processing, on the unformatted area from among the access areas (S12). The processing in these steps 11 and 12 may be executed after steps 13 and 15 described below.

Next, if it is determined that all the access areas have been formatted (S11: Yes) or after the CPU 70 executes the format processing on the unformatted area from among the access areas in step S12, the CPU 70 refers to the LU management table 90 based on the logical address and then judges whether the LU designated by the logical address is a normal LU or not (S13).

If it is determined in step S13 that the LU is a normal LU (S13: Yes), the CPU 70 calculates the physical address based on the logical address (S14), writes write data from the host computer 10 to the physical storage area of the storage unit 52 in accordance with the calculated physical address, and then terminates the processing in this routine.

On the other hand, if it is determined in step S13 that the LU is not a normal LU (S13: No), that is, the LU is a virtual LU, the CPU 70 refers to the virtual address table 98 based on the LU number and the virtual LU address and judges whether the entry with the relevant virtual LU address exists or not (S15).

If it is determined in step S15 that the entry with the relevant virtual LU address exists in the virtual table 98(S15: Yes), that is, there is a hit, the CPU 70 calculates the physical address from the virtual address of the relevant entry (S16), writes the write data from the host computer 10 to the physical storage area of the storage unit 52 based on the calculated physical address, thereby terminating the processing in this routine.

If it is determined in step S15 that there is no hit (S15: No), the CPU 70 newly calculates the physical LU address of an available storage area in the virtual LU address (that is, a storage area corresponding to the virtual LU address regarding which FFFFFFFF is stored in the corresponding physical LU address field 606) as new registration processing (S17) and adds the calculated physical LU address as an entry to the virtual address table 98 (S18), thereby terminating the processing in this routine.

Figure 11:
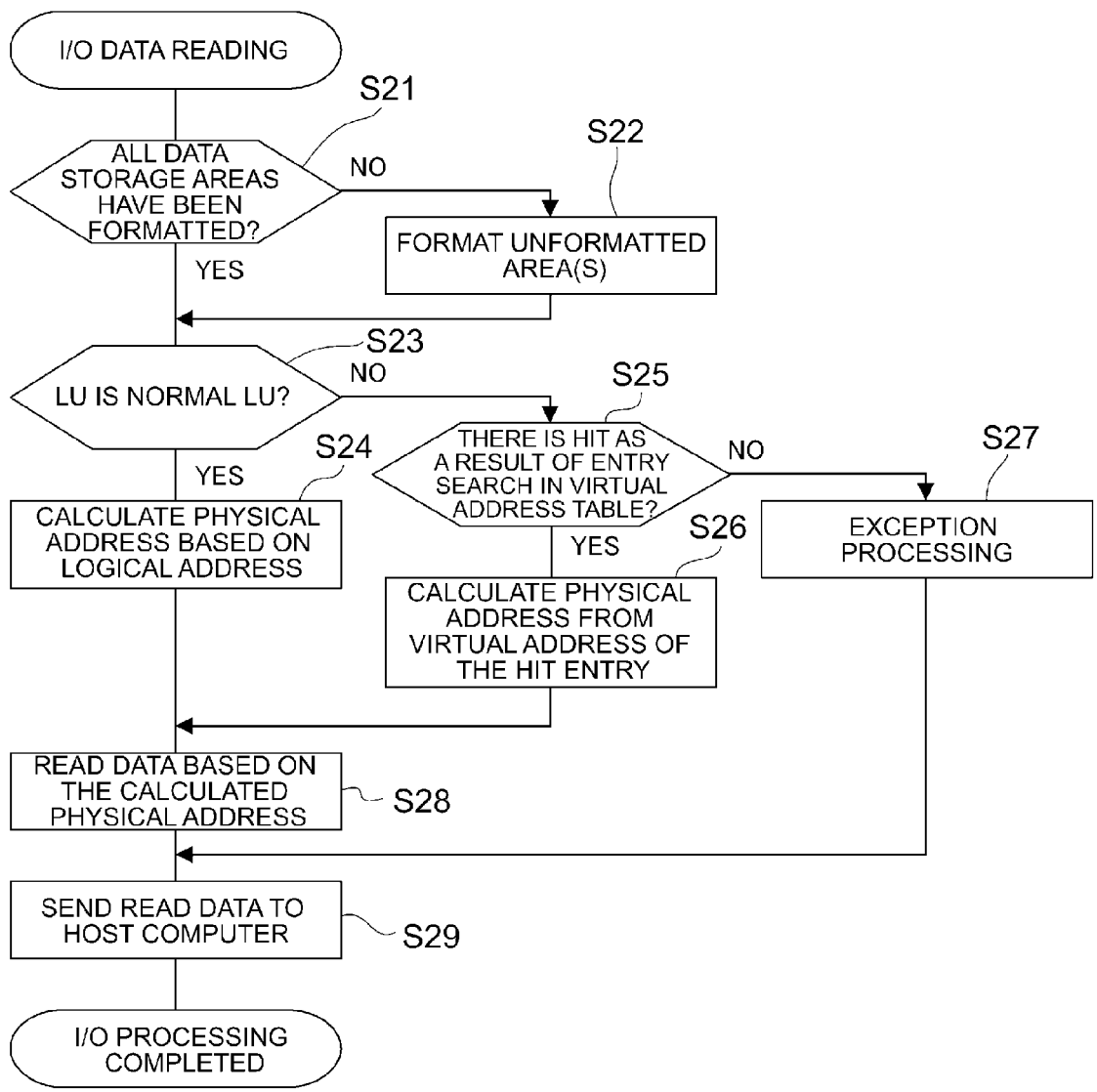
FIG. 11 is a flowchart explaining processing for reading I/O data.

Next, I/O data read processing will be explained with reference to a flowchart in FIG. 11. This processing is executed by the CPU 70 for the controller 26.

The CPU 70 receives read access as an access request from the host computer 10 and judges whether all access areas designated by a logical address attached to the read access have been formatted or not (S21). If it is determined that all the access areas have not been formatted (S21: No), the CPU 70 executes the format processing, for example, quick format processing, on the unformatted area from among the access areas (S22). The processing in these steps 21 and 22 may be executed after steps 24 and 25 described below.

Next, if it is determined that all the access areas have been formatted (S21: Yes) or after the CPU 70 executes the format processing on the unformatted area from among the access areas in step S22, the CPU 70 refers to the LU management table 90 based on the logical address and then judges whether the LU designated by the logical address is a normal LU or not (S23).

If it is determined in step S23 that the LU is a normal LU (S23: Yes), the CPU 70 calculates the physical address based on the logical address (S24) and proceeds to processing in step S28.

On the other hand, if it is determined in step S23 that the LU is not a normal LU (S13: No), that is, the LU is a virtual LU, the CPU 70 refers to the virtual address table 98 based on the LU number and judges whether or not the entry with the relevant LU number exists in the virtual address table 98 (S25).

If it is determined in step S25 that the entry with the relevant LU number exists in the virtual table 98 (S25: Yes), that is, there is a hit, the CPU 70 calculates the physical address from the virtual address of the relevant entry (S26) and proceeds to the processing in step S28. If it is determined in step S25 that there is no hit (S15: No), the CPU 70 executes exception processing for displaying an error message stating that data is not written. Specifically speaking, since a logical storage area is not allocated to the storage area of the accessed virtual LU, data to be read does not exist and, therefore, an error occurs (S27).

Subsequently, as processing after step S24 or step S26, the CPU 70 reads data from the storage unit 52 based on the physical address calculated in step S24 or step S26 (S28) and sends the read data to the host computer 10 (S29), thereby terminating the processing in this routine.

Figure 12:
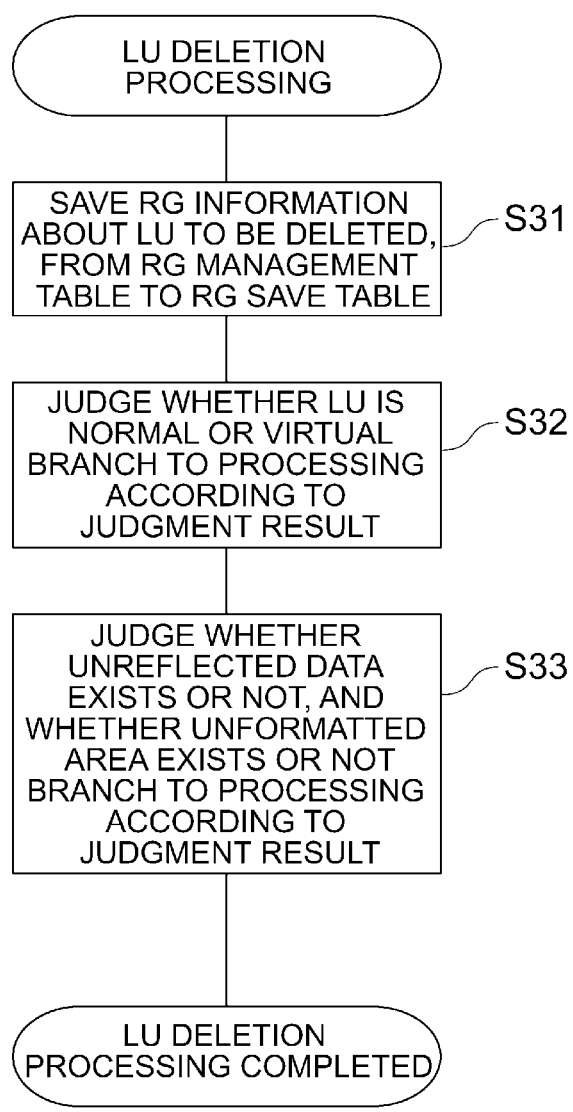
FIG. 12 is a flowchart explaining LU deletion processing according to a first embodiment.

Next, LU deletion processing according to the first embodiment will be explained with reference to a flowchart in FIG. 12. This processing is started by the CPU 70 activating the LU deletion program 82 on the condition that an LU deletion command is input from the management terminal 14 to the storage apparatus 12.

Firstly, if the logical address and the RAID group number (RG number) are input as information about a deletion target LU, together with the LU deletion command, from the management terminal 14, the CPU 70 refers the RG management table 92 based on the RG number in order to retain the setting information corresponding to the deletion target LU and copies and saves information about the deletion target LU, from among information recorded in the RG management table 92, to the save table 94 (S31).

For example, if the information about the deletion target LU is information recorded in the entry 520 of the RG management table 92, the CPU 70 copies and saves the information recorded in the entry 520 to the RG save table 94.

Next, the CPU 70 refers to the LU management table 90 based on the logical address of the deletion target LU, judges whether the deletion target LU is a normal LU or a virtual LU, and then executes processing according this judgment result (S32).

Subsequently, the CPU 70 refers to the LU management table 90 based on the logical address of the deletion target LU, judges whether or not an unreflected data exists in the deletion target LU and whether or not an unformatted area exists in the deletion target LU, and executes processing according to each judgment result (S34), thereby terminating the processing in this routine.

Figure 13:
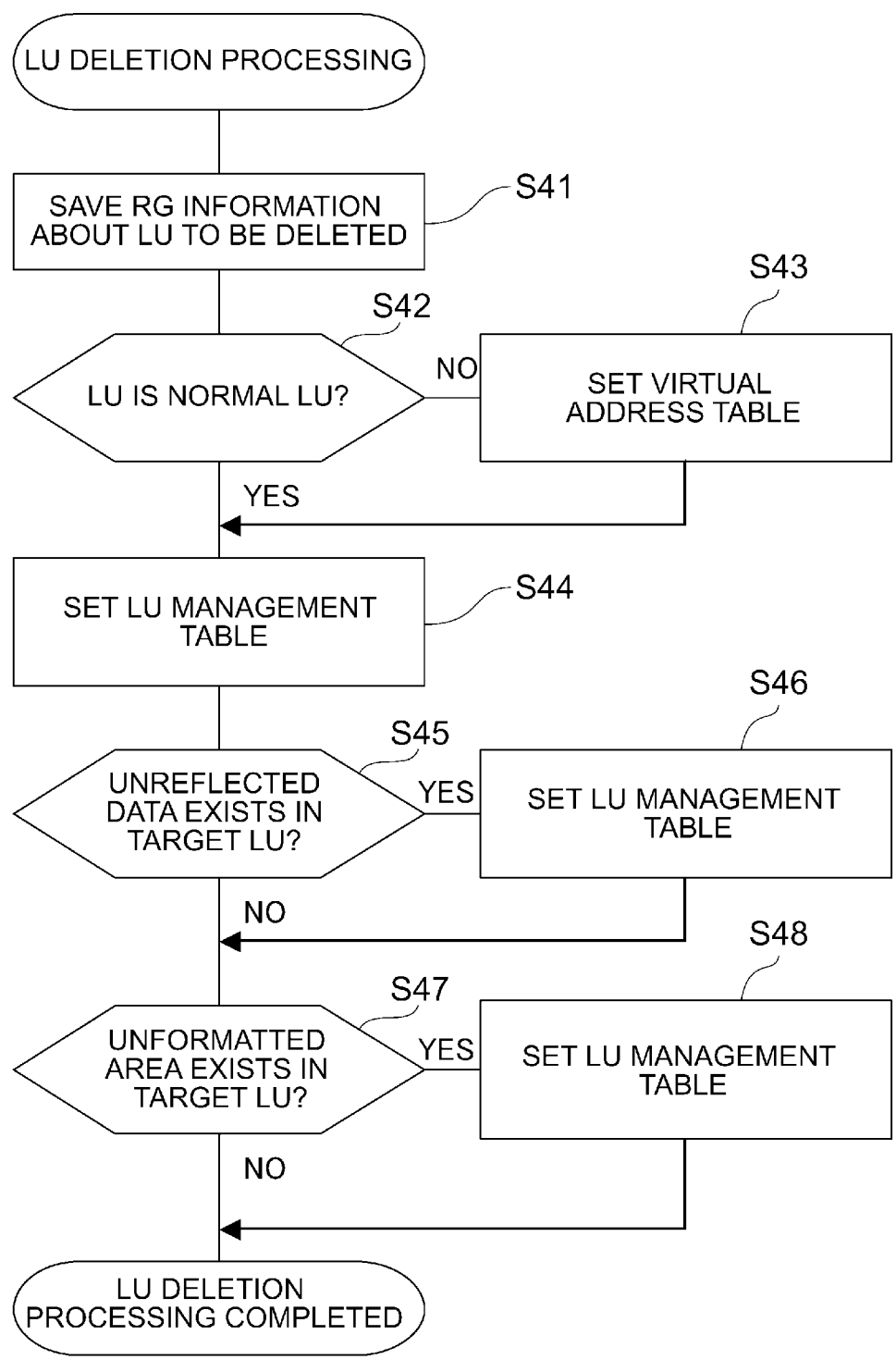
FIG. 13 is a flowchart explaining the detailed content of the LU deletion processing according to the first embodiment.

Next, the detailed content of the LU deletion processing will be explained with reference to a flowchart in FIG. 13.

Firstly, if the logical address and the RAID group number (RG number) are input as information about a deletion target LU, together with the LU deletion command, from the management terminal 14, the CPU 70 refers the RG management table 92 based on the RG number in order to retain the setting information corresponding to the deletion target LU and copies and saves information about the deletion target LU, from among information recorded in the RG management table 92, to the save table 94 (S41).

For example, if the information about the deletion target LU is information recorded in the entry 520 of the RG management table 92, the CPU 70 copies and saves the information recorded in the entry 520 to the RG save table 94.

Next, the CPU 70 refers to the LU management table 90 based on the logical address of the deletion target LU and judges whether the deletion target LU is a normal LU or a virtual LU, and then executes processing according this judgment result (S42).

If it is determined in step S42 that the deletion target LU is a virtual LU (S42: No), the CPU 70 refers to the virtual address table 98 based on the LU number and retains information for the relevant LU number (setting information) as reset information, and stores 1 as the retainment flag in the retainment flag field 608 of the entry with the relevant LU number. This setting information may be retained directly in the virtual address table 98 or retained in a table different from the virtual address table 98. For example, if the deletion target LU is virtual LU #2, the CPU 70 stores 1 in the retainment flag field 608 of each of the entries 620, 622 in the virtual address table 98 (S43).

Next, if it is determined in step S42 that the deletion target LU is a normal LU (S42: Yes) or if the CPU 70 sets 1 as the retainment flag to the virtual address table 98 in step S43, the CPU 70 refers to the LU management table 90 based on the logical address, retains information about the relevant LU number (setting information) as the reset information, and stores 1 in the restoration flag on/off field 312 of the entry for the relevant LU. This setting information may be retained directly in the LU management address table 98 or retained in a table different from the LU management address table 98 (S44).

For example, if the deletion target LU is normal LU #1, the CPU 70 stores 1 in the restoration flag on/off field 312 of the entry 322. If the deletion target LU is virtual LU #2, the CPU 70 stores 1 in the restoration flag on/off field 312 of the entry 324.

Subsequently, the CPU 70 judges whether or not any unreflected data exists in data related to the deletion target LU (S45); and if it is determined that the unreflected data exists (S45: Yes), the CPU 70 stores 0 in the unreflected data existence field 314 in the entry with relevant LU number and executes processing for reflecting the unreflected data in the storage units 52 (S46).

On the other hand, if it is determined in step S45 that any unreflected data does not exist in the deletion target LU (S45: No), or after the processing in step S46 terminates, the CPU 70 judges whether or not any unformatted area exists in the data storage area corresponding to the deletion target LU (S47); and if it is determined that any unformatted area does not exist (S47: No), the CPU 70 terminates the processing in this routine.

If it is determined in step S47 that the unformatted area exists (S47: Yes), the CPU 70 stops the format processing which is being executed, stores 1 in the unformatted area existence field 316 in the relevant entry of the deletion target LU in the LU management table 90, retains information indicating that the unformatted area exists, in the data storage area corresponding to the deletion target LU, and further retains the information in the bitmap table 96 (S48), thereby terminating the processing in this routine.

Figure 14:
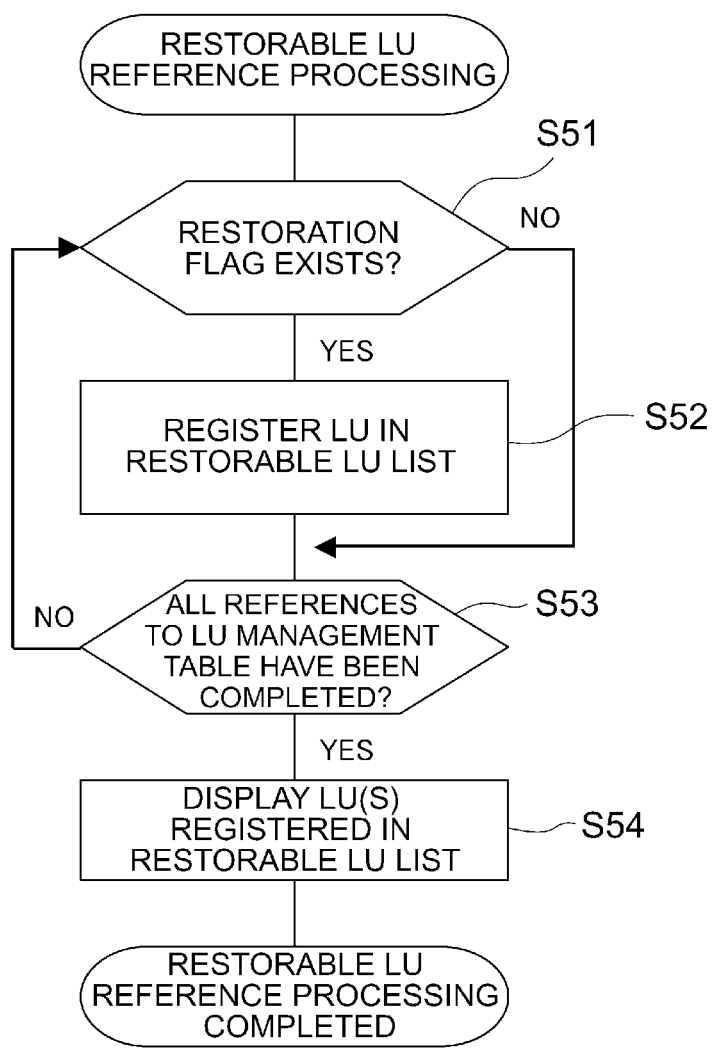
FIG. 14 is a flowchart explaining restorable LU reference processing according to the first embodiment.

Next, restorable LU reference processing will be explained with reference to a flowchart in FIG. 14.

This processing is executed by the CPU 70 activating the restorable LU reference program 84 on the condition that a restorable LU reference command is input from the management terminal 14 to the storage apparatus 12.

Firstly, the CPU 70 refers to the LU management table 90 based on the restorable LU reference command from the management terminal 14 and judges whether or not information indicating that the restoration flag is on, exists in the restoration flag on/off field 312 exists, that is, whether or not information 1 exists in the restoration flag on/off field 312 (S51).

If it is determined in step S51 that the information 1 does not exist (S51: No), the CPU 70 proceeds to processing in step S53; and if it is determined that the information 1 exists (S51: Yes), the CPU 70 registers information in the entry where the restoration flag is on, that is, the entry where the information 1 is stored in the restoration flag on/off field 12, in a restorable list (S52). In this case, information in the unreflected data existence field 314 is also registered in the restorable list.

Subsequently, the CPU 70 judges whether or not all the entries in the LU management table 90 have been searched (S53). If the search of all the entries has not been completed (S53: No), the CPU 70 repeats the processing from step S51 to step S53; and if it is determined that the search of all the entries has been completed (S53: Yes), the CPU displays the LUs registered in the restorable LU list on the status display unit 24 (S54), thereby terminating the processing in this routine.

Figure 15:
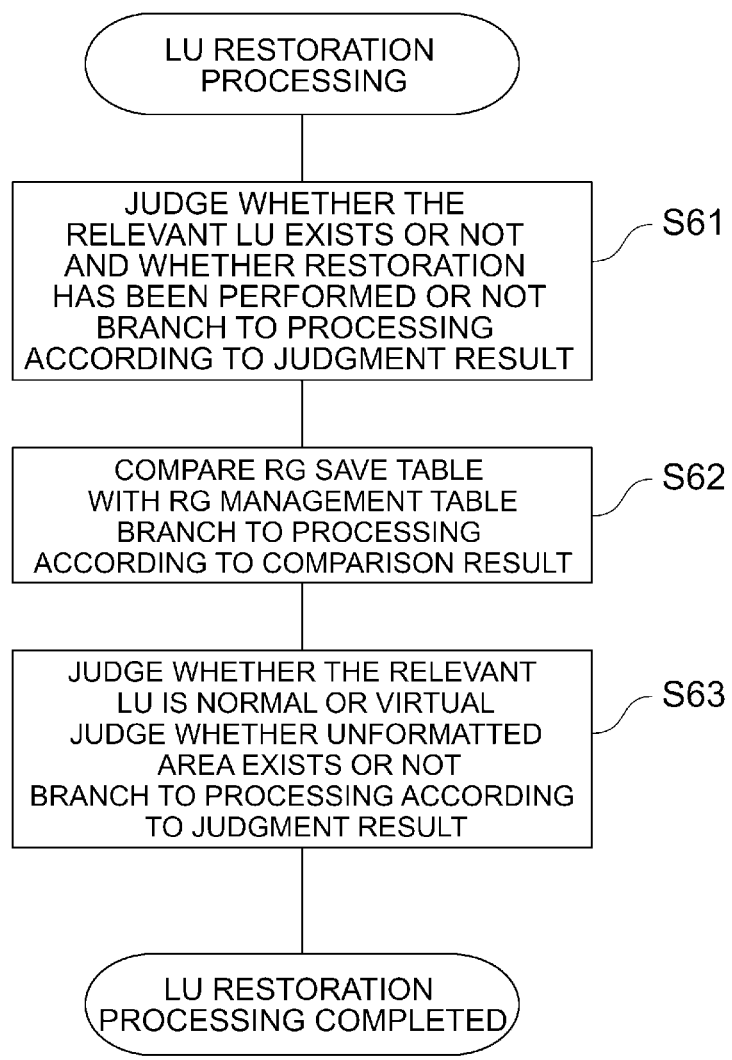
FIG. 15 is a flowchart explaining LU restoration processing according to the first embodiment.

Next, LU restoration processing will be explained with reference to a flowchart in FIG. 15.

This processing is started by the CPU 70 activating the LU restoration command program 86 on the condition that an LU restoration command is input from the management terminal 14 to the storage apparatus 12.

Firstly, the CPU 70 refers to the restorable list, judges whether the relevant LU exists or not, that is, whether or not a restorable LU exists in the restorable list, then judges whether restoration has been performed or not, and executes processing in accordance with each judgment result (S61).

Next, the CPU 70 compares information stored in the RG save table 94 with information stored in the RG management table 92 and executes processing in accordance with this comparison result (S62).

Subsequently, the CPU 70 refers to the LU management table 90 based on the logical address, judges whether the restoration target LU is a normal LU or a virtual LU, judges whether the data storage area of the restoration target LU is an unformatted area or not, and executes processing in accordance with each judgment result (S63), thereby terminating the processing in this routine.

Figure 16:
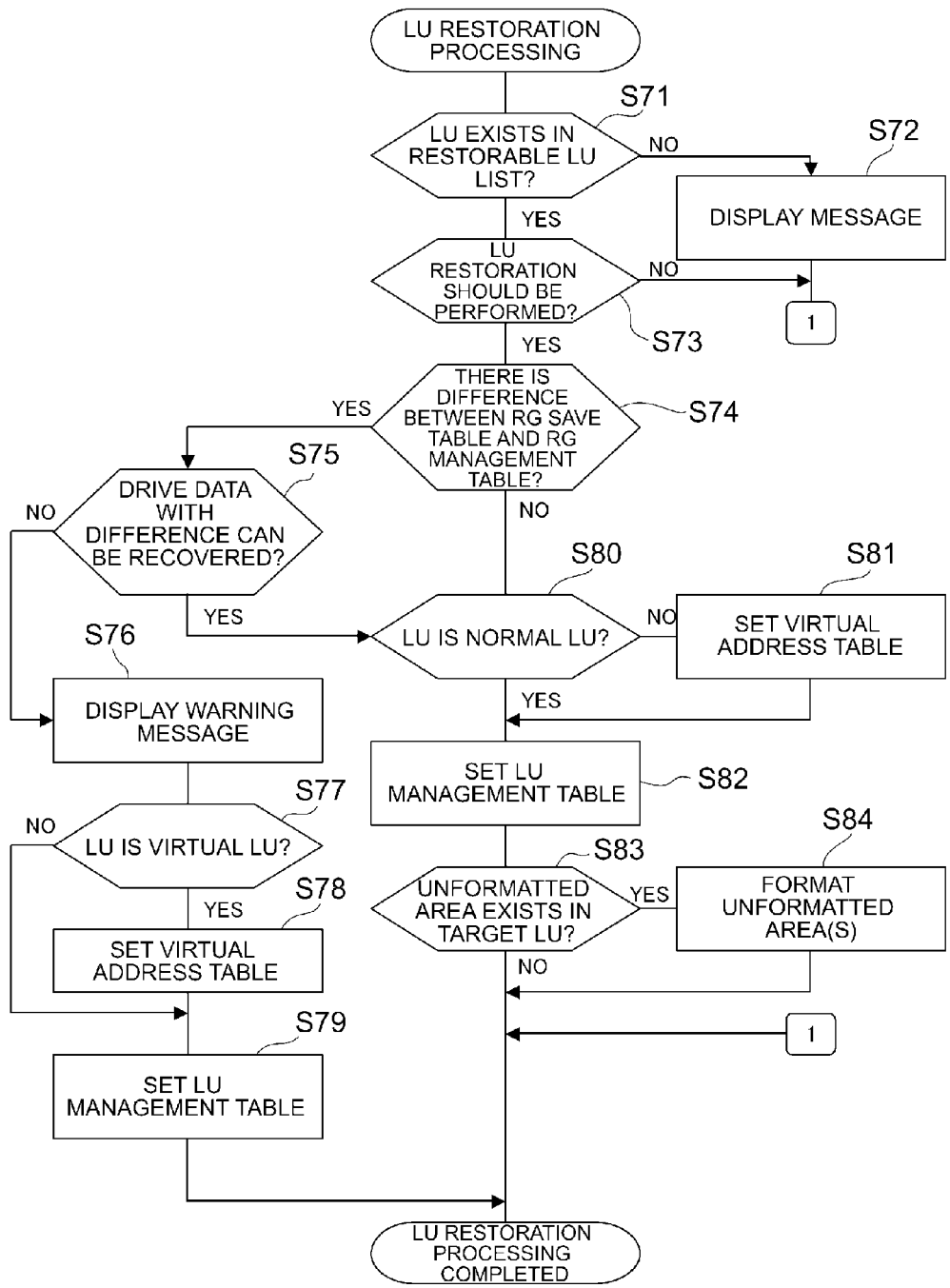
FIG. 16 is a flowchart explaining the detailed content of the LU restoration processing according to the first embodiment.

Next, the detailed content of LU restoration processing will be explained with reference to a flowchart in FIG. 16.

This processing is started by the CPU 70 activating the LU restoration command program 86 on the condition that an LU restoration command (the LU restoration command to restore a deletion target LU as an access target LU for the host computer 10) is input from the management terminal 14 to the storage apparatus 12.

Firstly, the CPU 70 refers to the restorable LU list and judges whether or a restorable LU exists in the restorable LU list (S71); and if it is determined that any restorable LU does not exist (S71: No), the CPU 70 displays a message stating that no restorable LU exists, on the status display unit 24 (S72), thereby terminating the processing in this routine.

If it is determined in step S71 that the restorable LU exists in the restorable LU list (S71: Yes), the CPU 70 judges whether restoration of the LU existing in the restorable LU list should be performed or not (S73).

If it is determined in step S73 that the LU restoration should not be performed (S73: No), the CPU 70 terminates the processing in this routine; and if it is determined that the LU restoration should be performed (S73: Yes), the CPU 70 recognizes that LU as a restoration target LU, compares information stored in the RG save table 94 with information stored in the RG management table 92, and judges whether there is any difference between them (S74).

If it is determined in step S74 that the contents of these two tables do not are not consistent with each other (S74: Yes), there is a possibility that some storage unit(s) 52, from among the storage units 52 constituting the restoration target LU, may have been replaced after the LU deletion and before the LU restoration. So, the CPU 70 judges whether data of the storage unit 52 with the difference can be recovered or not (S75). Specifically speaking, if a failure occurs, some of the storage units 52 constituting the restoration target LU may be replaced after the LU deletion and before the LU restoration. Therefore, there is a possibility that the storage unit 52 whose product number recorded in the RG save table 94 is different from that recorded in the RG management table 92 may have been replaced due to, for example, the occurrence of a failure. So, the CPU 70 judges whether the data of the storage unit 52 with different product numbers can be recovered or not.

A specific explanation will be given below by taking, as an example, a case where a normal LU belonging to a RAID group of RAID 4 constituted from four storage units 52 for data storage and one storage unit 52 for parity storage is the restoration target LU. If it is found as a result of the comparison between the RG management table 92 and the RG save table 94 that one storage unit has been replaced, it is possible to recover data stored in the storage unit 52 before data replacement by means of parity recovery, so that it is determined in step S75 that the data can be recovered. Furthermore, if two storage units have been replaced, data stored in the storage units 52 before replacement cannot be recovered even by means of the parity recovery, so that it is determined that the data cannot be recovered.

If it is determined in step S75 that the data of the drive with the difference cannot be recovered (S75: No), the CPU 70 displays a warning messaging stating that the data cannot be restored because the drive was replaced after the LU deletion, on the status display unit 24 (S76), refers to the LU management table 90 based on the logical address relating to the restoration target LU, and judges whether the restoration target LU is a virtual LU or not (S77).

If it is determined in step S77 that the restoration target LU is not a virtual LU (S77: No), the CPU 70 proceeds to processing in step S79; and if it is determined that the restoration target LU is a virtual LU (S77: Yes), the CPU 70 refers to the virtual address table 98 based on the LU number and clears all the pieces of information in the relevant entry of the restoration target LU in the virtual address table 98 (S78).

Subsequently, the CPU 70 refers to the LU management table 90 based on the LU number, clears all the pieces of information in the relevant entry of the restoration target LU in the LU management table 90, and discards the unreflected data and bit information in the bitmap table 96 corresponding to the restoration target LU (S79), thereby terminating the processing in this routine.

On the other hand, if it is determined in step S75 that the data of the drive with the difference can be recovered (S75: Yes), or if it is determined in step S74 that the contents of the two tables are not consistent with each other (S74: No), the CPU 70 refers to the LU management table 90 based on the LU number and judges whether the restoration target LU is a normal LU or not (S80).

If it is determined in step S80 that the restoration target LU is a virtual LU (S80: No), the CPU 70 refers to the virtual address table 98 based on the LU number, restores the retained reset information as the setting information corresponding to the access target LU, reflects the restored setting information in the relevant entry of the virtual address table 98, then sets 0 to the retainment flag field 608 of the relevant entry in the virtual address table 98 (S81), and proceeds to processing in step S82.

Subsequently, if it is determined in step S80 that the restoration target LU is a normal LU (S80: Yes), or after the processing in step S81 terminates, the CPU 70 refers to the LU management table 90 based on the logical address, restores the retained reset information as the setting information corresponding to the access target LU, reflects the restored setting information in the relevant entry of the LU management table 90, then stores 0 as information indicating that the restoration flag is off, in the restoration flag on/off field 312 of the LU management table 90 (S82), refers to the unformatted area existence field 316, and judges whether or not any unformatted area exists in the data storage area of the restoration target LU (S83).

If it is determined in step S83 that the unformatted area does not exist in the data storage area of the restoration target LU (S83: No), the CPU 70 terminates the processing in this routine; and if it is determined that the unformatted area exists in the data storage area of the restoration target LU (S83: Yes), the CPU 70 executes the format processing on the unformatted area in the data storage area of the restoration target LU and stores 0 as information indicating that the unformatted area does not exist, in the unformatted area existence field 316 of the relevant entry of the restoration target LU in the LU management table 90 (S84), thereby terminating the processing in this routine.

Figure 17:
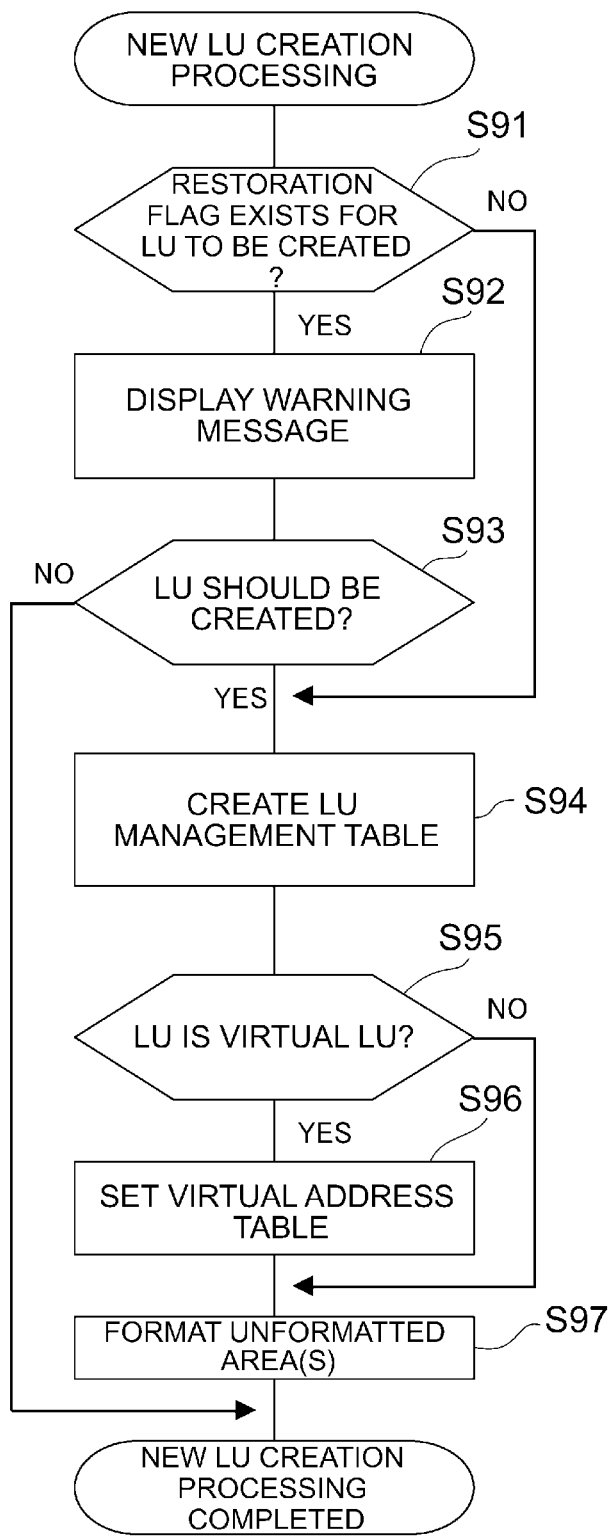
FIG. 17 is a flowchart explaining new LU creation processing according to the first embodiment.

Next, new LU creation processing will be explained with reference to a flowchart in FIG. 17.

This processing is started by the CPU 70 activating the new LU creation program 88 on the condition that a new LU creation command is input from the management terminal 14 to the storage apparatus 12.

Firstly, the CPU 70 refers to the LU management table 90 based on the LU number used for an LU to be newly created (new creation target LU) and judges whether the restoration flag is on or not (S91).

If it is determined in step S91 that the restoration flag is off for the LU to be newly created (S91: No), the CPU 70 proceeds to processing in step S94; and if it is determined that the restoration flag is on for the LU to be newly created (S91: Yes), this means that the same logical address as that of the LU to be newly created exists in the LU management table 90, so the CPU 70 displays a warning message stating that the LU deleted last time cannot be restored, on the status display unit 24 (S92) and judges whether the LU should be newly created or not (S93).

If a command stating that it is unnecessary to newly create the LU is input by, for example, the user operation in step S93 (S93: No), the CPU 70 terminates the processing in this routine; and if a command stating that it is necessary to newly create the LU (S93: Yes), that is, if it is determined to newly create the LU, or if it is determined in step S91 that the restoration flag is off for the LU to be newly created (S91: No), the CPU 70 sets information about the logical address and information about, for example, the loading start position, the loading end position, and the physical start address, as the setting information about the LU to be newly created to the entry of the LU to be newly created in the LU management table 90 and sets the normal/virtual type (S94).

In this case, information 0 indicating Off or No Existence is stored in the restoration flag on/off field 312, the unreflected data existence field 314, and the unformatted area existence field 316 in the entry of the LU to be newly created.

Next, the CPU 70 refers to the normal/virtual LU field 310 of the entry of the LU to be newly created and judges whether the LU is a virtual LU or not (S95). If the LU is a normal LU (S95: No), the CPU 70 proceeds to processing in step S97; and if it is determined that the LU is a virtual LU (S95: Yes), the CPU 70 adds a new entry to the virtual address table 98 and sets information such as the LU number, the RG number, the virtual address, and the physical address of the virtual LU to the newly added entry (S96).

Subsequently, the CPU 70 executes the format processing on the unformatted area in the data storage area of the new creation target LU (S97), thereby terminating the processing in this routine.

According to this embodiment, the CPU 70 for the controller 26 manages a plurality of LUs by using the setting information, in which the relationship between the LU number of each LU and a data storage area corresponding to that LU number is set, using the LU management table 90 and the virtual address table 98. When receiving an LU deletion command from the management terminal 14 and if the LU is a normal LU, information about a deletion target LU, from among information in the LU management table 90, is retained as the reset information; and if the LU is a virtual LU, information about the deletion target LU, from among information in the virtual address table 98, is also retained as the reset information and the execution of the format processing on the a data storage area corresponding to the LU number of the deletion target LU is withheld. Subsequently, when receiving an LU restoration command from the management terminal 14 to restore the deletion target LU as an access target LU, the retained reset information is restored as the setting information corresponding to the access target LU and the restored setting information is managed by using the LU management table 90 or the virtual address table 98. As a result, an access request from the host computer 10 can be processed.

Even if the user deletes an LU due to misoperation, the user can restore the deletion target LU as the access target LU according to this embodiment without executing the format processing by performing the operation to issue an LU restoration command from the management terminal 14 after the LU deletion. In other words, even if a command to delete an LU is issued, the deletion target LU can be restored as the access target LU on the condition that a command to restore the deletion target LU is issued thereafter. As a result, it is possible to contribute to enhancement of data integrity and operability.

Furthermore, according to this embodiment, when the deletion command to delete the deletion target LU is issued and if any unreflected data relating to that LU exists, the unreflected data is reflected in the storage units 52 during the LU deletion processing and, therefore, it is possible to inhibit compression of the storage area in the cache memory 42 by the unreflected data and restore data that is consistent with data before the LU deletion command was issued.

Furthermore, according to this embodiment, whether or not any unformatted area exists in the data storage area of the relevant LU is managed during the LU deletion processing; and if the unformatted area exists in the data storage area of the relevant LU, the deletion target LU is restored as the access target LU and then the format processing is executed on the unformatted area in the data storage area of the LU by using the bitmap table 96. So, it is only necessary to format the unformatted area and, therefore, it is possible to promptly execute the LU restoration processing.

Second Embodiment

This embodiment is designed so that when an LU deletion command is issued from the management terminal 14, information about the deletion target LU, from among information in the LU management table 90, is retained as reset information on the condition that the LU is a normal LU; and if an LU restoration command to restore the deletion target LU as an access target LU is issued from the management terminal 14, the retained reset information is restored as setting information corresponding to the access target LU; and if parity calculated from data does not match stored parity, forced parity recovery is executed. The configuration of the storage apparatus 12 is the same as that in the first embodiment.

Figure 18:
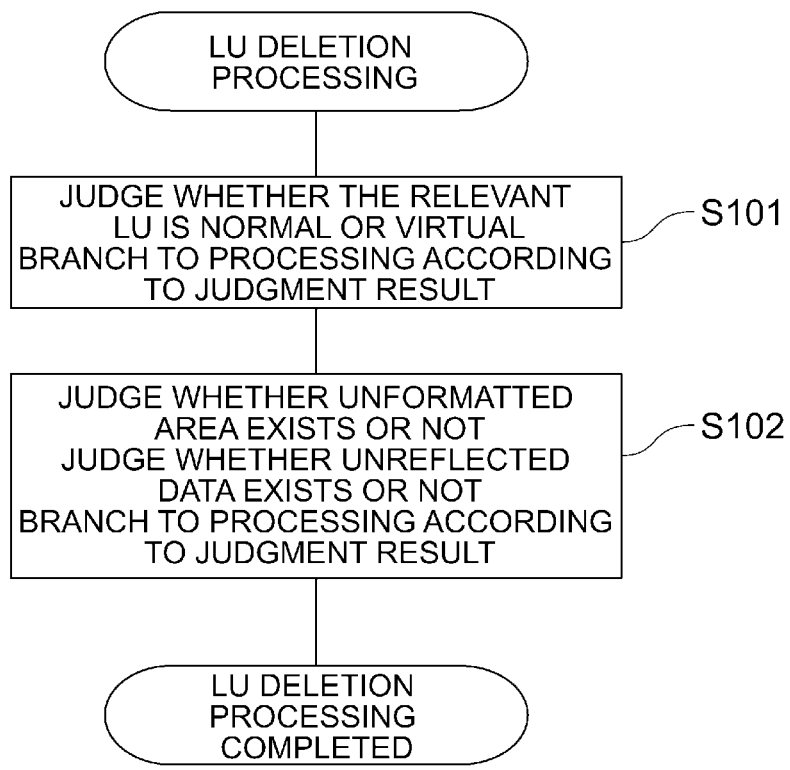
FIG. 18 is a flowchart explaining LU deletion processing according to a second embodiment.

Next, LU deletion processing according to the second embodiment will be explained with reference to a flowchart in FIG. 18. This processing is started by the CPU 70 activating the LU deletion program 82 on the condition that an LU deletion command is input from the management terminal 14 to the storage apparatus 12.

Firstly, when the logical address is input as information about the deletion target LU, together with the LU deletion command, from the management terminal 14, the CPU 70 refers to the LU management table 90 based on the logical address of the deletion target LU in order to retain setting information corresponding to the deletion target LU, judges whether the deletion target LU is a normal LU or a virtual LU, and then executes processing according to the judgment result (S101).

Subsequently, the CPU 70 refers to the LU management table 90 based on the logical address of the deletion target LU, judges whether or not any unreflected data exists in the deletion target LU and whether or not any unformatted area exists in the deletion target LU, and then executes processing in accordance with each judgment result (S103), thereby terminating the processing in this routine.

Figure 19:
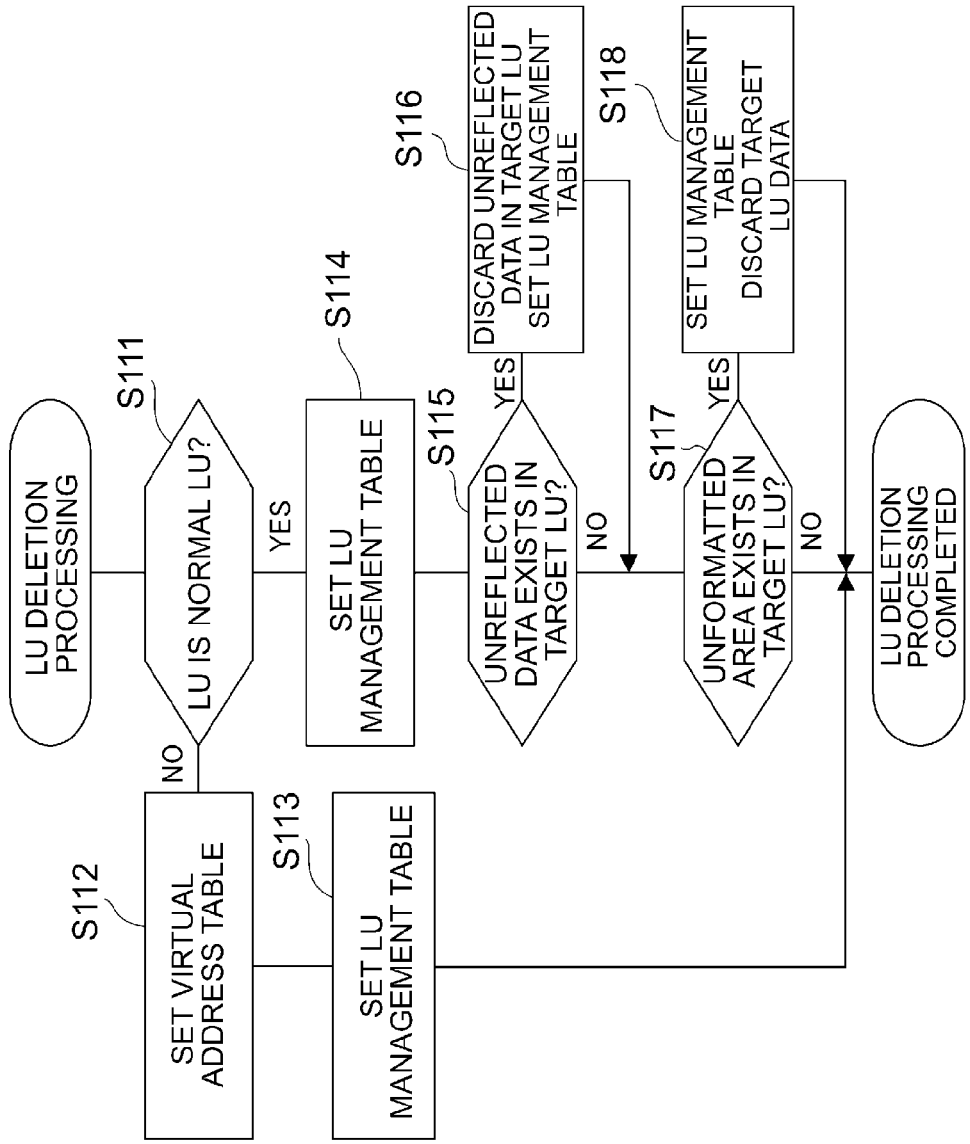
FIG. 19 is a flowchart explaining the detailed content of the LU deletion processing according to the second embodiment.

Next, the detailed content of the LU deletion processing will be explained with reference to a flowchart in FIG. 19.

Firstly, when the logical address is input as information about the deletion target LU, together with the LU deletion command, from the management terminal 14, the CPU 70 refers to the LU management table 90 based on the logical address of the deletion target LU in order to retain the setting information corresponding to the deletion target LU and judges whether the deletion target LU is a normal LU or a virtual LU (S111).

If it is determined in step S111 that the deletion target LU is a virtual LU (S111: No), the CPU 70 refers to the virtual address table 98 based on the LU number of the logical address and clears all the pieces of information in the relevant entry of the restoration target LU in the virtual address table 98 (S112).

Subsequently, the CPU 70 refers to the LU management table 90 based on the LU number, clears all the pieces of information in the relevant entry of the deletion target LU in the LU management table 90, and discards the unreflected data and bit information in the bitmap table 96 corresponding to the deletion target LU (S113), thereby terminating the processing in this routine.

On the other hand, if it is determined in step S111 that the deletion target LU is a normal LU (S111: Yes), the CPU 70 refers to the LU management table 90 based on the LU number, retains information about the relevant LU number (the setting information) as reset information, and stores 1 in the restoration flag on/off field 312 of the entry of the relevant LU (S114).

For example, if the deletion target LU is normal LU #1, 1 is stored in the restoration flag on/off field 312 of the entry 322.

Subsequently, the CPU 70 judges whether or not any unreflected data exists in data related to the deletion target LU (S115); and if it is determined that the unreflected data exists (S115: Yes), the CPU 70 stores 1 in the unreflected data existence field 314 of the entry with the relevant LU number, discards the unreflected data, and proceeds to processing in step S117 (S116).

On the other hand, if it is determined in step S115 that any unreflected data does not exist in the deletion target LU (S115: No), or after the processing in step S116 terminates, the CPU 70 judges whether or not any unformatted area exists in the data storage area corresponding to the deletion target LU (S117); and if it is determined that any unformatted area does not exist (S 117: No), the CPU 70 terminates the processing in this routine.

If it is determined in step S117 that the unformatted area exists (S117: Yes), the CPU 70 stores 1 in the unformatted area existence field 316 of the relevant entry of the deletion target LU in the LU management table 90 and retains information in the bitmap table 96 (S118), thereby terminating the processing in this routine.

Figure 20:
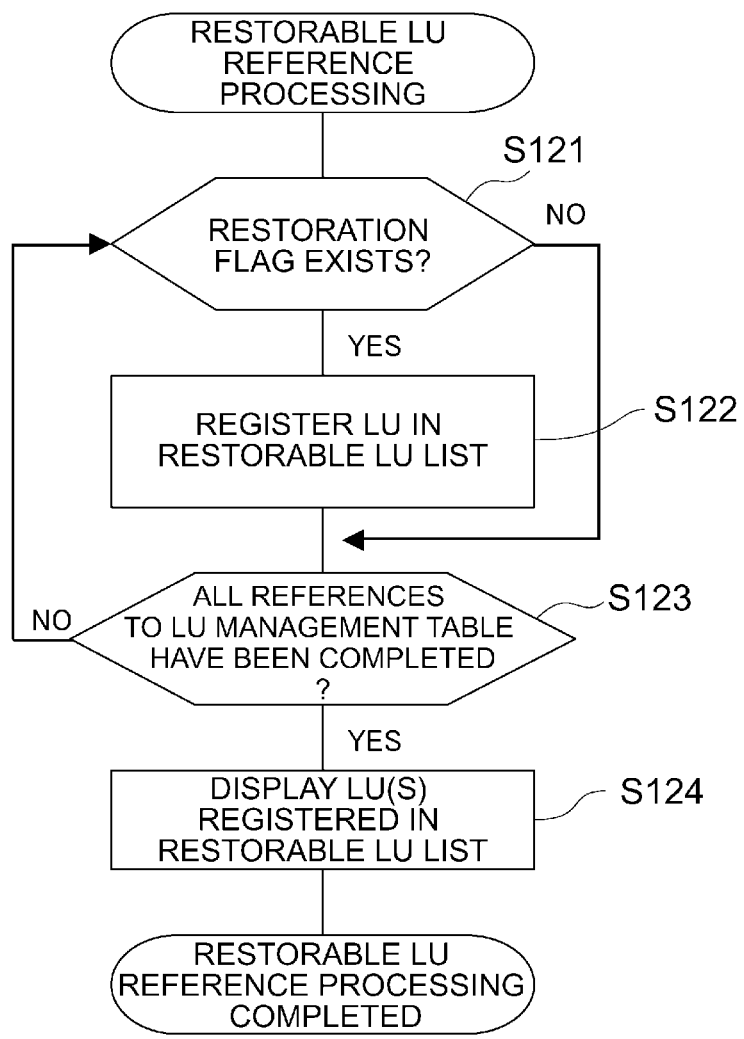
FIG. 20 is a flowchart explaining restorable LU reference processing according to the second embodiment.

Next, restorable LU reference processing will be explained with reference to a flowchart in FIG. 20.

This processing is started by the CPU 70 activating the restorable LU reference program 84 on the condition that a restorable LU reference command is input from the management terminal 14 to the storage apparatus 12.

Firstly, the CPU 70 refers to the LU management table 90 based on the restorable LU reference command from the management terminal 14 and judges whether or not information indicating that the restoration flag is on, exists in the restoration flag on/off field 312, that is, whether or not information 1 exists in the restoration flag on/off field 312 (S121).

If it is determined in step S51 that the information 1 does not exist (S121: No), the CPU 70 proceeds to processing in step S123; and if it is determined that the information 1 exists (S121: Yes), the CPU 70 registers information about the entry, in which the restoration flag is on, that is, which stores the information 1 in the restoration flag on/off field 12, in a restorable list (S122). In this case, information in the unreflected data existence field 314 is also registered in the restorable list.

Subsequently, the CPU 70 judges whether or not all the entries in the LU management table 90 have been searched (S123). If the search of all the entries has not been completed (S123: No), the CPU 70 repeats the processing from step S121 to step S123; and if it is determined that the search of all the entries has been completed (S123: Yes), the CPU displays the LUs registered in the restorable LU list on the status display unit 24 (S124), thereby terminating the processing in this routine.

Figure 21:
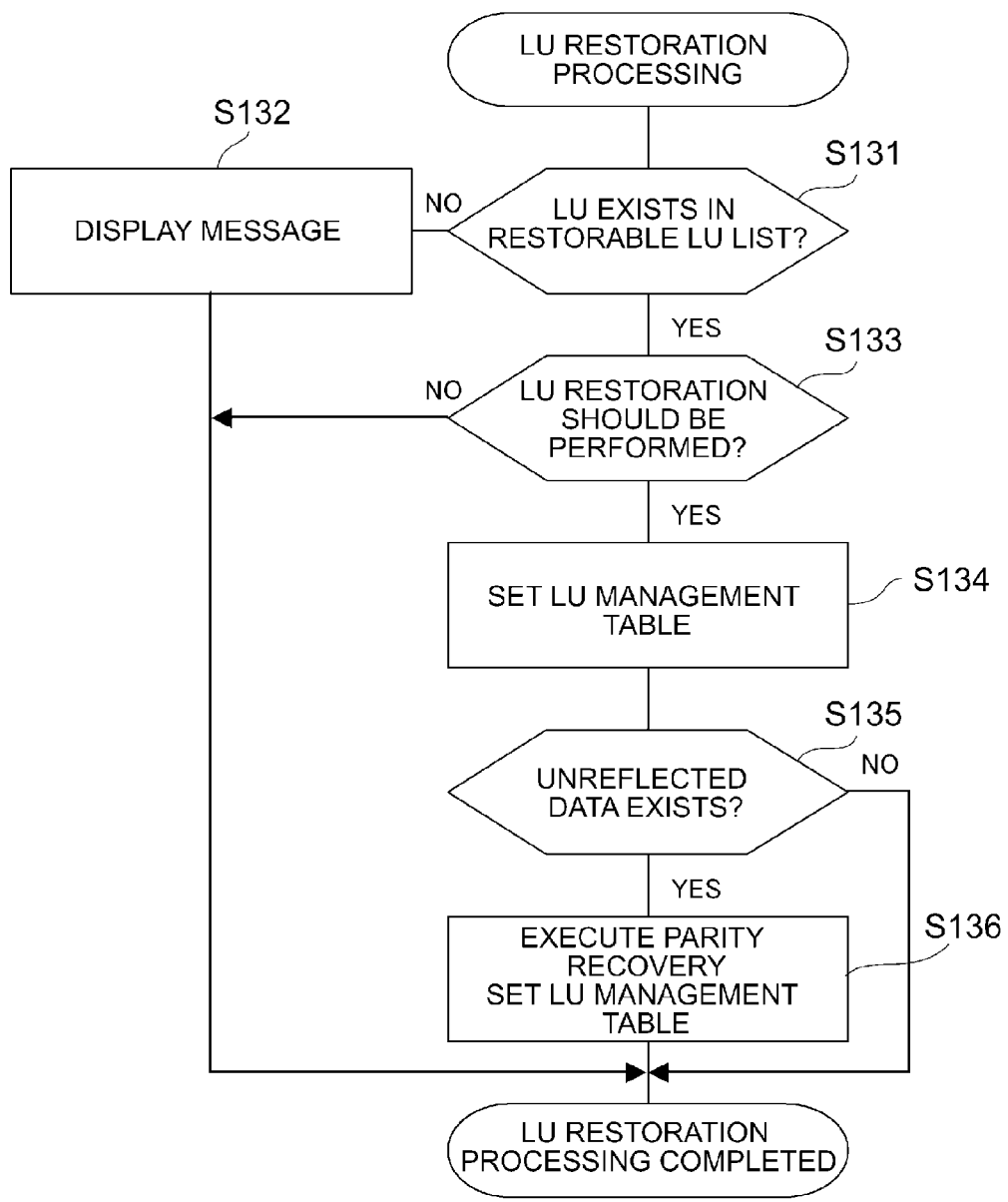
FIG. 21 is a flowchart explaining LU restoration processing according to the second embodiment.

Next, LU restoration processing will be explained with reference to a flowchart in FIG. 21. This processing is started by the CPU 70 activating the LU restoration command program 86 on the condition that an LU restoration command (the LU restoration command to restore the deletion target LU as an access target LU for the host computer 10) is input from the management terminal 14 to the storage apparatus 12.

Firstly, the CPU 70 refers to the restorable LU list and judges whether or not a restorable LU exists in the restorable LU list (S131); and if it is determined the restorable LU does not exist (S131: No), the CPU 70 displays a message stating that no restorable LU exists, on the status display unit 24 (S132), thereby terminating the processing in this routine.

On the other hand, if it is determined in step S131 that the restorable LU exists in the restorable LU list (S131: Yes), the CPU 70 judges whether restoration of the LU existing in the restorable LU list should be performed or not (S133).

If it is determined in step S133 that the LU restoration should not be performed (S133: No), the CPU 70 terminates the processing in this routine.

On the other hand, if it is determined in step S133 that the LU restoration should be performed (S133: Yes), the CPU 70 recognizes the relevant LU as a restoration target LU, refers to the LU management table 90 based on the logical address, restores the retained reset information as the setting information corresponding to the access target LU, reflects the restored setting information in the relevant entry of the LU management table 90, and stores 0 as information indicating that the restoration flag is off, in the restoration flag on/off field 312 of the LU management table 90 (S134).

Subsequently, the CPU 70 judges whether or not the information 1 indicating that the unreflected data exists, exists in the unreflected data existence field 314 of the LU management table 90 (S135).

If it is determined in step S135 that 1 does not exist in the unreflected data existence field 314 of the LU management table 90 (S135: No), the CPU 70 terminates the processing in this routine.

If it is determined in step S135 that 1 exists in the unreflected data existence field 314 of the LU management table 90 (S135: Yes), the CPU 70 executes the parity recovery processing, thereby terminating the processing in this routine (S136).

The parity recovery processing is processing, for example, as shown in FIG. 8, executed by the CPU 70 for comparing the parity value 800 created by reading a data value stored in the storage units 52 for data storage from among the storage units 52 with the parity value 802 read from the storage unit 52 for parity storage and checking whether these two values are equal to each other or not.

If it is determined as a result of this check that these two parity values are different, the CPU 70 writes the parity value, which is created based on the data value read from the storage units 52 #0 to #3 for data storage, as a new parity value to the storage unit 52 for parity storage and makes the two parity values identical to each other, thereby making it possible to recover the parity value mismatch. Furthermore, this parity value mismatch may occur when the LU deletion processing is executed while writing data from the cache memory 42 to the storage units 52, and unreflected data in the cache memory 42 is then discarded.

Figure 22:
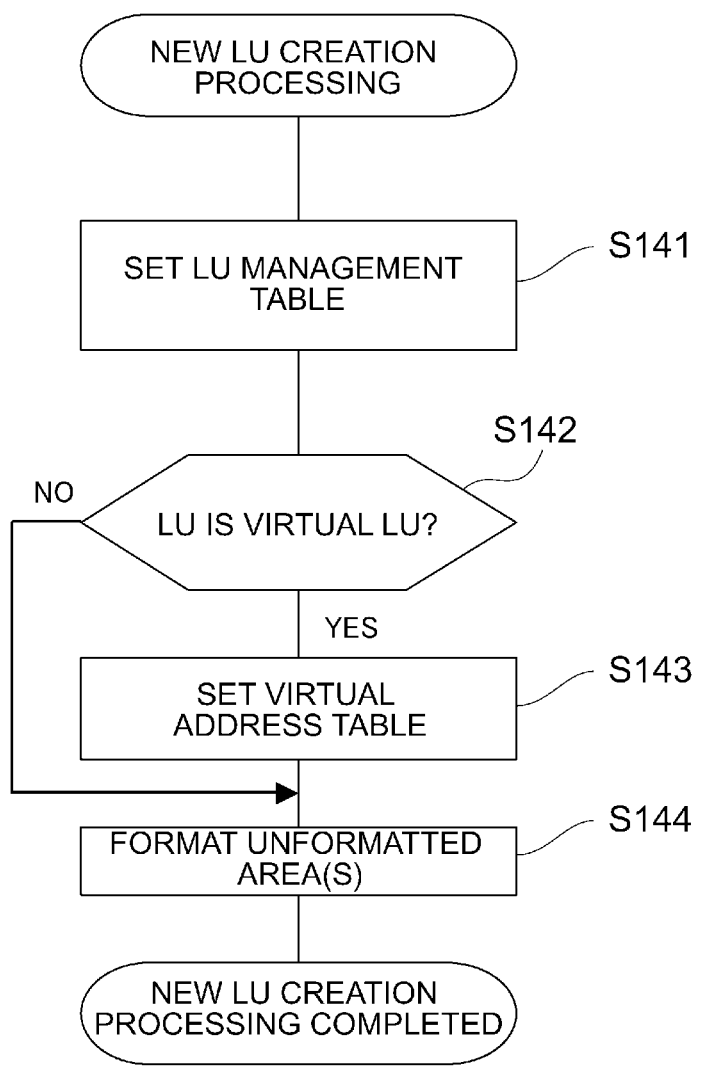
FIG. 22 is a flowchart explaining new LU creation processing according to the second embodiment.

Next, new LU creation processing will be explained with reference to a flowchart in FIG. 22. This processing is started by the CPU 70 activating the new LU creation program 88 on the condition that a new LU creation command is input from the management terminal 14 to the storage apparatus 12.

Firstly, the CPU 70 sets information about the logical address and information about, for example, the loading start position, the loading end position, and the physical start address, as the setting information about the LU to be newly created to the entry of the LU to be newly created in the LU management table 90 and sets the normal/virtual type (S141).

In this case, information 0 indicating Off or No Existence is stored in the restoration flag on/off field 312, the unreflected data existence field 314, and the unformatted area existence field 316 of the entry of the LU to be newly created.

Next, the CPU 70 refers to the normal/virtual LU field 310 of the entry of the LU to be newly created and judges whether the LU is a virtual LU or not (S142). If the LU is a normal LU (S142: No), the CPU 70 proceeds to processing in step S144; and if it is determined that the LU is a virtual LU (S142: Yes), the CPU 70 adds a new entry to the virtual address table 98 and sets information such as the LU number, the RG number, the virtual address, and the physical address of the virtual LU to the newly added entry (S143).

Subsequently, the CPU 70 executes the format processing on the unformatted area in the data storage area of the new creation target LU (S144), thereby terminating the processing in this routine.

According to this embodiment, the CPU 70 for the controller 26 manages a plurality of LUs by using the setting information, in which the relationship between the LU number of each LU and a data storage area corresponding to that LU number is set, using the LU management table 90. When receiving an LU deletion command from the management terminal 14 and if the LU is a normal LU, information about a deletion target LU, from among information in the LU management table 90, is retained as the reset information; and the execution of the format processing on the data storage area corresponding to the LU number of the deletion target LU is withheld. Subsequently, when receiving an LU restoration command from the management terminal 14 to restore the deletion target LU as an access target LU, the retained reset information is restored as the setting information corresponding to the access target LU and the restored setting information is managed by using the LU management table 90. As a result, an access request from the host computer 10 can be processed.

Even if the user deletes an LU due to misoperation, the user can restore the deletion target LU as the access target LU according to this embodiment without executing the format processing by performing the operation to issue an LU restoration command from the management terminal 14 after the LU deletion; and it is also possible to contribute to enhancement of data integrity and operability. In this case, it is designed to restore only the normal LUs as LUs, so that the processing required for the LU restoration processing can be more simplified than that in the first embodiment; and because the virtual LUs are not managed, it is possible to reduce managed data.

Furthermore, when the LU deletion command to delete the deletion target LU is issued, this embodiment is designed to discard unreflected data relating to that LU even if the unreflected data relating to the LU exists. Therefore, it is possible to inhibit compression of the storage area in the cache memory 42 by the unreflected data and simplify the processing.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be deleted, or added to, or replaced with, the configuration of another configuration.

Furthermore, part or all of the aforementioned configurations, functions, processing units, processing means, and so on may be realized by hardware by, for example, designing them in integrated circuits. Also, each of the aforementioned configurations, functions, and so on may be realized by software by the processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 Host computer
12 Storage apparatus
14 Management terminal
16, 18, 20 Networks
26, 28 Controllers
30 Storage device
40 FC interface
42 Cache memory
44 Drive interface
46 Disk controller
52 Storage units
70 CPU
80 I/O processing program 82 LU deletion program
84 Restorable LU reference program
86 LU restoration command program
88 New LU creation program
90 LU management table
92 RG management table
94 RG save table
96 Bitmap table
98 Virtual address table

The invention claimed is:

1. A storage subsystem comprising:
a storage device including a plurality of storage units for storing data;
a controller configured to control data input/output processing on the storage device based on an access request from an access requester;
wherein the controller is configured to manage a plurality of logical units, which constitute a logical storage area of the storage device, by using setting information in which a relationship between a logical address of each logical unit and a data storage area corresponding to the logical address of each logical unit is set;
wherein when receiving a command to delete a deletion target logical unit, which is a target to be deleted from among the plurality of logical units, from a management terminal connected to the controller, the controller is configured to retain setting information about the deletion target logical unit, from among the setting information, as reset information; and
wherein when receiving a restoration command to restore the deletion target logical unit as an access target logical unit from the management terminal, the controller is configured to restore the retained reset information as the setting information corresponding to the access target logical unit; and
a cache memory configured to temporarily store data which are a target of processing by the controller,
wherein when receiving the deletion command from the management terminal, the controller is configured to judge whether or not any unreflected data, which are related to the deletion target logical unit and are not reflected in the storage device, exist in data stored in the cache memory; and
when it is determined that the unreflected data exist in the cache memory, the controller is configured to reflect the unreflected data in the storage device in accordance with the setting information.

2. The storage subsystem according to claim 1, wherein the controller is configured to:
manage the plurality of logical units by dividing them into a plurality of normal logical units for which a logical storage area is associated with a physical storage area of the storage units, and a plurality of virtual logical units for which the physical storage area of the storage units is allocated to a virtual storage area;
retain a logical unit management table for managing the normal logical units and a virtual address table for managing the virtual logical units;
record information, to which a relationship between a logical unit number of each logical unit, a loading position in the storage unit corresponding to each logical unit number, and a physical address corresponding to the loading position of each logical unit is set, as information belonging to the setting information in the logical unit management table by associating the information with each normal logical unit and each virtual logical unit;
record information, to which a relationship between a virtual address of each virtual logical unit and a physical address corresponding to the virtual address of each virtual logical unit is set, as information belonging to the setting information in the virtual address table by associating the information with each virtual logical unit;
retain information in the logical unit management table corresponding to the deletion target logical unit, from among the logical unit management table, as the reset information when the deletion target logical unit which is a target of the deletion command is the normal logical unit;
retain information in the virtual address table corresponding to the deletion target logical unit, from among the virtual address table, as the reset information and to retain information in the logical unit management table corresponding to the deletion target logical unit, from among the logical unit management table, when the deletion target logical unit which is the target of the deletion command is the virtual logical unit;
restore information in the logical unit management table corresponding to the deletion target logical unit, from among the retained reset information, as the setting information corresponding to the access target logical unit when the access target logical unit which is a target of the restoration command is the normal logical unit; and
restore information in the virtual address table corresponding to the deletion target logical unit, from among the retained reset information, as the setting information corresponding to the access target logical unit when the access target logical unit which is the target of the restoration command is the virtual logical unit.

3. The storage subsystem according to claim 1, wherein when receiving the deletion command from the management terminal, the controller is configured to judge whether or not any unformatted area exists in a data storage area corresponding to the logical address of the deletion target logical unit; and
when it is determined that the unformatted area exists in the data storage area corresponding to the logical address of the deletion target logical unit, the controller is configured to specify the unformatted area and then to execute format processing on the specified unformatted area on the condition that he retained reset information has been restored as the setting information corresponding to the access target logical unit.

4. The storage subsystem according to claim 1,
wherein when receiving the deletion command from the management terminal, the controller is configured to judge whether or not any unformatted area exists in a data storage area corresponding to the logical address of the deletion target logical unit; and
when it is determined that the unformatted area exists in the data storage area corresponding to the logical address of the deletion target logical unit, the controller is configured to specify the unformatted area and then to execute format processing on the specified unformatted area on the condition that the retained reset information has been restored as the setting information corresponding to the access target logical unit.

5. The storage subsystem according to claim 1, wherein the controller is configured to:
manage the plurality of storage units by using a storage unit management table and to record specific storage unit information that specifies each storage unit in the storage unit management table;

retain information in the storage unit management table corresponding to the deletion target logical unit, from among the management table, in a save table when receiving the deletion command to delete the deletion target logical unit from the management terminal;

compare the storage unit management table corresponding to the deletion target logical unit with the save table when receiving the restoration command to restore the deletion target logical unit as the access target logical unit from the management terminal;

determine that a storage unit has been replaced in storage units constituting the deletion target logical unit and to judge whether or not data to be stored in the replaced storage unit can be recovered when the content of the storage unit management table is not consistent with that of the save table as a result of the comparison;

restore the retained reset information as the setting information corresponding to the access target logical unit when it is determined that the data to be stored in the replaced storage unit can be recovered; and output a warning message when it is determined that the data to be stored in the replaced storage unit cannot be recovered.

6. The storage subsystem according to claim 2, wherein when the information in the logical unit management table corresponding to the deletion target logical unit, from among the logical unit management table, is retained as the reset information, the controller is configured to record a restoration flag indicating that the information in the logical unit management table corresponding to the deletion target logical unit is retained in the logical unit management table and to record the logical unit management table, in which the restoration flag is recorded, in a restorable list; and wherein when the access target logical unit which is the target of the restoration command is the normal logical unit, the controller is configured to select the logical unit management table corresponding to the access target logical unit from among the logical unit management table recorded in the restorable list and to restore information in the selected logical unit management table as the setting information corresponding to the access target logical unit.

7. A logical unit processing method for a storage subsystem including:
a storage device including a plurality of storage units for storing data;
a controller configured to control data input/output processing on the storage device based on an access request from an access requester; and
a cache memory configured to store temporarily data which are a target of processing by the controller;
the logical unit processing method comprising:
a step executed by the controller of managing a plurality of logical units, which constitute a logical storage area of the storage device, by using setting information in which a relationship between a logical address of each logical unit and a data storage area corresponding to the logical address of each logical unit is set;
when receiving a command to delete a deletion target logical unit, which is a target to be deleted from among the plurality of logical units, from a management terminal connected to the controller, a step executed by the controller of retaining setting information about the deletion target logical unit, from among the setting information, as reset information;

a step executed by the controller of withholding format processing on a data storage area corresponding to the logical address of the deletion target logical unit;

when receiving a restoration command to restore the deletion target logical unit as an access target logical unit from the management terminal, a step executed by the controller of restoring the retained reset information as the setting information corresponding to the access target logical unit;

when receiving the deletion command from the management terminal, a step executed by the controller of judging whether or not any unreflected data, which are related to the deletion target logical unit and are not reflected in the storage device, exist in data stored in the cache memory; and when it is determined that the unreflected data exist in the cache memory, a step executed by the controller of reflecting the unreflected data in the storage device in accordance with the setting information.

8. The logical unit processing method for the storage subsystem according to claim 7, further comprising:
a step executed by the controller of managing the plurality of logical units by dividing them into a plurality of normal logical units for which a logical storage area is associated with a physical storage area of the storage units, and a plurality of virtual logical units for which the physical storage area of the storage units is allocated to a virtual storage area;
a step executed by the controller of retaining a logical unit management table for managing the normal logical units and a virtual address table for managing the virtual logical units;
a step executed by the controller of recording information, to which a relationship between a logical unit number of each logical unit, a loading position in the storage unit corresponding to each logical unit number, and a physical address corresponding to the loading position of each logical unit is set, as information belonging to the setting information in the logical unit management table by associating the information with each normal logical unit and each virtual logical unit;
a step executed by the controller of recording information, to which a relationship between a virtual address of each virtual logical unit and a physical address corresponding to the virtual address of each virtual logical unit is set, as information belonging to the setting information in the virtual address table by associating the information with each virtual logical unit;
a step executed by the controller of retaining information in the logical unit management table corresponding to the deletion target logical unit, from among the logical unit management table, as the reset information when the deletion target logical unit which is a target of the deletion command is the normal logical unit;
a step executed by the controller of retaining information in the virtual address table corresponding to the deletion target logical unit, from among the virtual address table, as the reset information and retaining information in the logical unit management table corresponding to the deletion target logical unit, from among the logical unit management table, when the deletion target logical unit which is the target of the deletion command is the virtual logical unit;
a step executed by the controller of restoring information in the logical unit management table corresponding to the deletion target logical unit, from among the retained reset information, as the setting information corresponding to the access target logical unit when the access target logical unit which is a target of the restoration command is the normal logical unit; and a step executed by the controller of restoring information in the virtual address table corresponding to the deletion target logical unit, from among the retained reset information, as the setting information corresponding to the access target logical unit when the access target logical unit which is the target of the restoration command is the virtual logical unit.

9. The logical unit processing method for the storage subsystem according to claim 7, further comprising:

when receiving the deletion command from the management terminal, a step executed by the controller of judging whether or not any unformatted area exists in a data storage area corresponding to the logical address of the deletion target logical unit;

when it is determined that the unformatted area exists in the data storage area corresponding to the logical address of the deletion target logical unit, a step executed by the controller of specifying the unformatted area; and a step executed by the controller of executing format processing on the specified unformatted area on the condition that the retained reset information has been restored as the setting information corresponding to the access target logical unit.

10. The logical unit processing method for the storage subsystem according to claim 7;

wherein when receiving the deletion command from the management terminal, a step executed by the controller of judging whether or not any unformatted area exists in a data storage area corresponding to the logical address of the deletion target logical unit;

when it is determined that the unformatted area exists in the data storage area corresponding to the logical address of the deletion target logical unit, a step executed by the controller of specifying the unformatted area; and a step executed by the controller of executing format processing on the specified unformatted area on the condition that the retained reset information has been restored as the setting information corresponding to the access target logical unit.

11. The logical unit processing method for the storage subsystem according to claim 7, further comprising:

a step executed by the controller of managing the plurality of storage units by using a storage unit management table and recording specific storage unit information that specifies each storage unit, in the storage unit management table;

a step executed by the controller of retaining information in the storage unit management table corresponding to the deletion target logical unit, from among the management table, in a save table when receiving the deletion command to delete the deletion target logical unit from the management terminal;

a step executed by the controller of comparing the storage unit management table corresponding to the deletion target logical unit with the save table when receiving the restoration command to restore the deletion target logical unit as the access target logical unit from the management terminal;

a step executed by the controller of determining that a storage unit has been replaced in storage units constituting the deletion target logical unit and judging whether or not data to be stored in the replaced storage unit can be recovered when the content of the storage unit management table is not consistent with that of the save table as a result of the comparison;

a step executed by the controller of restoring the retained reset information as the setting information corresponding to the access target logical unit when it is determined that the data to be stored in the replaced storage unit can be recovered; and a step executed by the controller of outputting a warning message when it is determined that the data to he stored in the replaced storage unit cannot be recovered.

12. The logical unit processing method for the storage subsystem according to claim 8, further comprising:

a step executed by the controller of recording a restoration flag indicating that the information in the logical unit management table corresponding to the deletion target logical unit is retained, in the logical unit management table when the information in the logical unit management table corresponding to the deletion target logical unit, from among the logical unit management table, is retained as the reset information;

a step executed by the controller of recording the logical unit management table, in which the restoration flag is recorded, in a restorable list;

a step executed by the controller of selecting the logical unit management table corresponding to the access target logical unit from among the logical unit management table recorded in the restorable list when the access target logical unit which is the target of the restoration command is the normal logical unit; and a step executed by the controller of restoring information in the selected logical unit management table as the setting information corresponding to the access target logical unit.

* * * * *